United States Patent [19]

Platzer, Jr.

[11] Patent Number: 5,080,492

[45] Date of Patent: * Jan. 14, 1992

[54] MIRROR AND APPARATUS FOR POSITIONING MIRROR

[76] Inventor: George E. Platzer, Jr., 424 Cypress Rd., Rochester Hills, Mich. 48309

[*] Notice: The portion of the term of this patent subsequent to Jul. 23, 2008 has been disclaimed.

[21] Appl. No.: 533,844

[22] Filed: Jun. 6, 1990

Related U.S. Application Data

[63] Continuation-in-part of Ser. No. 281,667, Dec. 9, 1988, Pat. No. 5,033,835.

[51] Int. Cl.⁵ .......................... B60R 1/06; B60R 1/08; G02B 7/18
[52] U.S. Cl. ..................................................... 359/877
[58] Field of Search ................................. 350/632-637

[56] References Cited

U.S. PATENT DOCUMENTS

| | | | |
|---|---|---|---|
| 4,247,172 | 1/1981 | Wunsch et al. | 350/636 |
| 4,267,494 | 5/1981 | Matsuoka et al. | 350/637 |
| 4,428,649 | 1/1984 | Main et al. | 350/637 |
| 4,640,590 | 2/1987 | Wunsch | 350/637 |
| 4,727,302 | 2/1988 | Mizuta et al. | 350/637 |
| 4,834,522 | 5/1989 | Janowicz | 350/637 |

FOREIGN PATENT DOCUMENTS

| | | | |
|---|---|---|---|
| 274848 | 12/1987 | European Pat. Off. | 350/637 |
| 3705991 | 9/1988 | Fed. Rep. of Germany | 350/637 |
| 27143 | 3/1979 | Japan | 350/637 |
| 27144 | 3/1979 | Japan | 350/637 |
| 49730 | 4/1979 | Japan | 350/637 |
| 867538 | 4/1983 | Japan | 350/637 |
| 224829 | 12/1983 | Japan | 350/637 |
| 38150 | 3/1984 | Japan | 350/637 |
| 53247 | 3/1984 | Japan | 350/637 |
| 291242 | 12/1986 | Japan | 350/605 |

Primary Examiner—Jon W. Henry
Attorney, Agent, or Firm—Lon H. Romanski

[57] ABSTRACT

A mirror structure, for use as a rear view mirror, is shown as having a main viewing mirror portion and an auxiliary viewing mirror portion; when the mirror structure is adjusted so that a selected reference portion, of the vehicle which carries the mirror structure, is seen in the auxiliary viewing mirror portion, the main viewing mirror portion is simultaneously positioned to provide an enhanced view of existing traffic. In another form, the mirror is first positioned so that the selected reference portion of the vehicle is viewed therein, and then the mirror is rotated a preselected amount as to present a view further angularly displaced from the vehicle as to thereby provide an enhanced view of existing traffic. Electronic logic and power circuitry is shown enabling the main viewing mirror to be moved into an initial position whereby the selected reference portion of the vehicle is seen and then, upon actuation of a switch, causing the main viewing mirror to be swung laterally to provide an enhanced view of existing traffic.

9 Claims, 13 Drawing Sheets

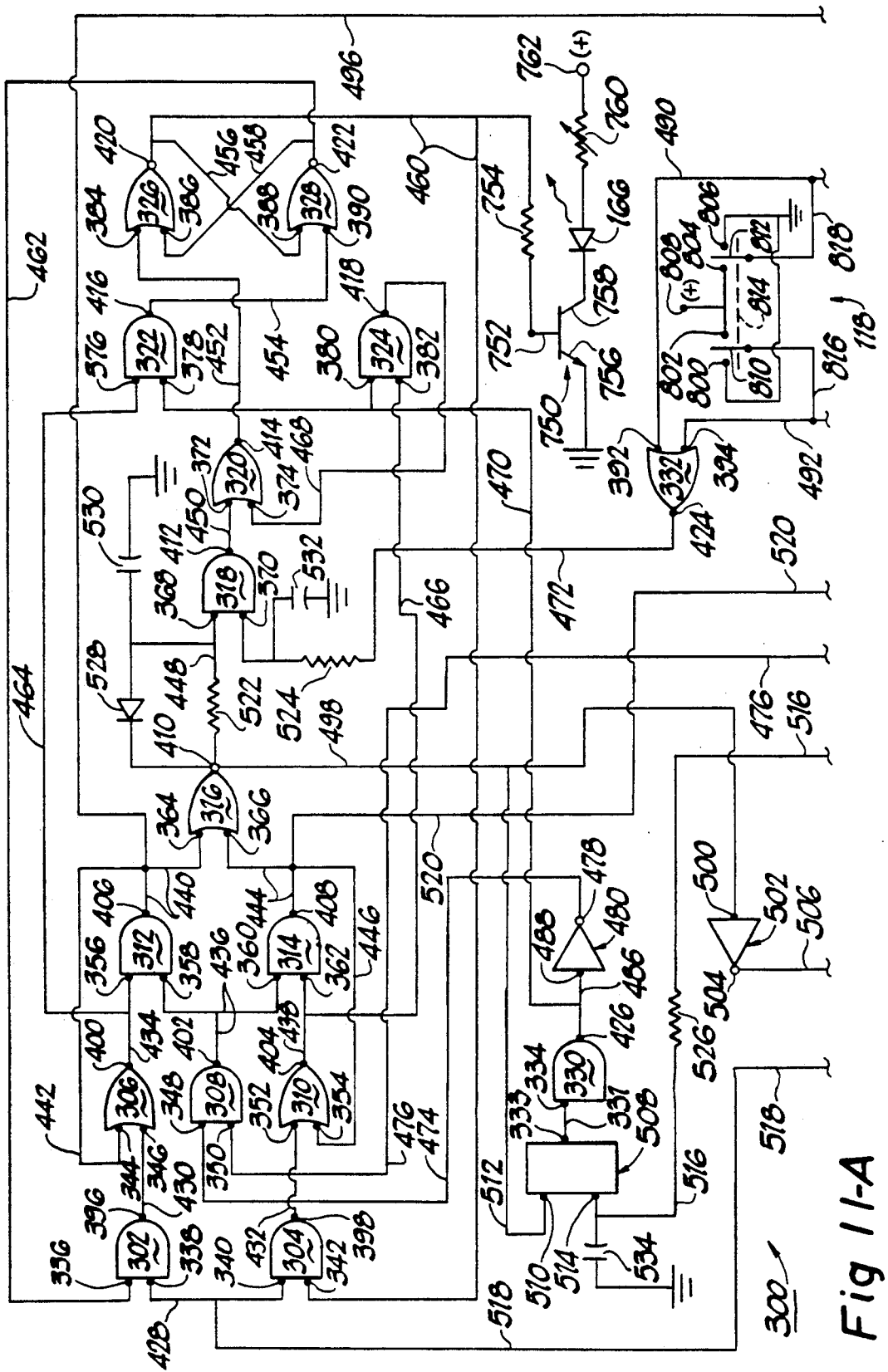

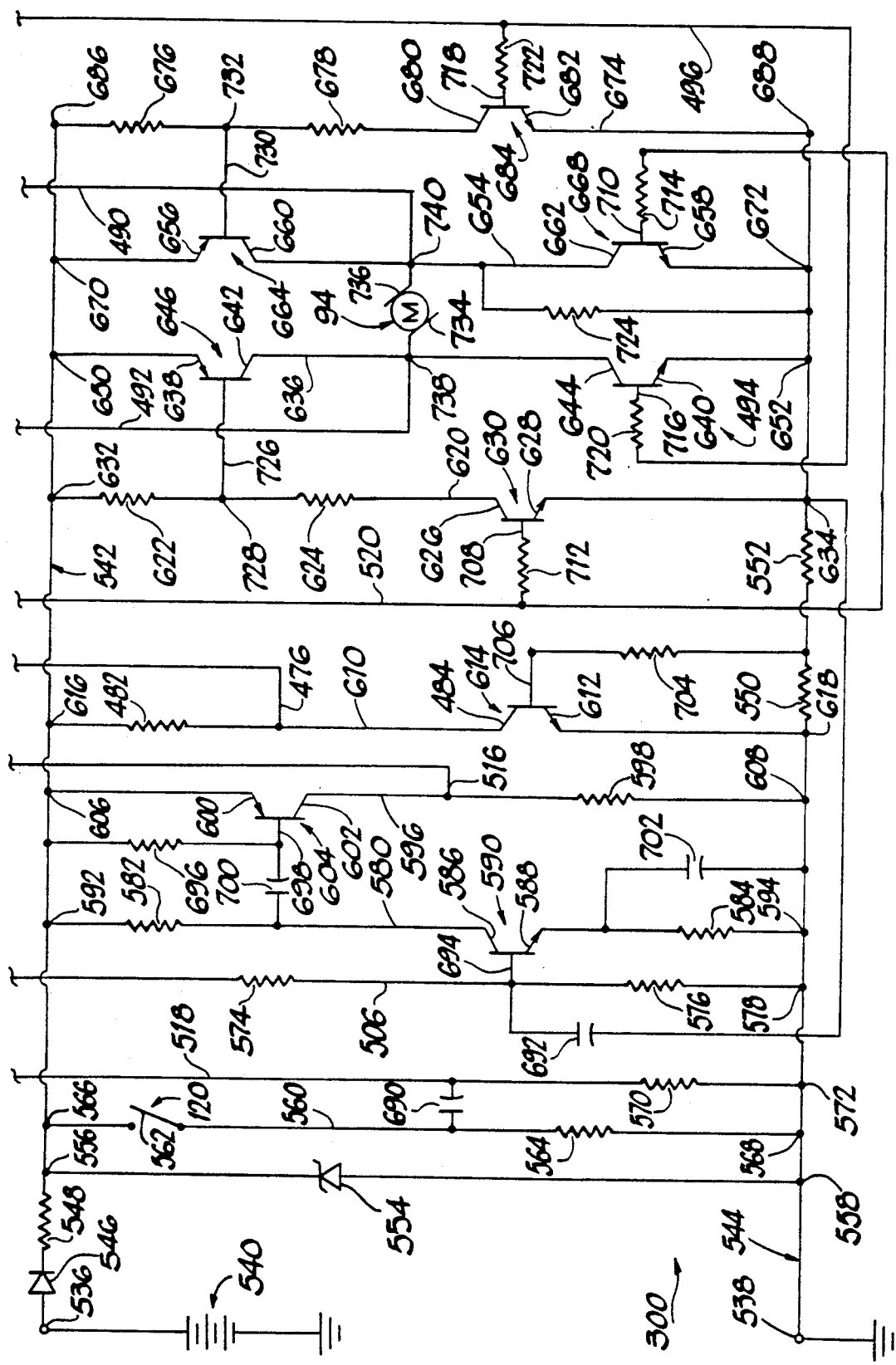
Fig 11-B

MIRROR AND APPARATUS FOR POSITIONING MIRROR

RELATED APPLICATION

This application is a Continuation-in-Part of my co-pending application Ser. No. 281,667 filed Dec. 9, 1988, for, MIRROR now U.S. Pat. No. 5,033,835.

FIELD OF THE INVENTION

This invention relates generally to mirrors and more particularly to mirrors employed in combination with automotive vehicles.

BACKGROUND OF THE INVENTION

In the past, automotive vehicles, such as, for example, automobiles, were provided with a mirror, mounted within the interior of the passenger compartment, by which the vehicle operator (driver) could obtain a view rearwardly directed of such vehicle Such interior mounted rear view mirror was intended to enable the vehicle driver to see whether a following vehicle was in the act of passing or if the roadway, to the driver's side, was clear of vehicles thereby making it safe for that driver to, for example, pass another leading vehicle.

Subsequently, additional rear view mirrors were placed on automotive vehicles in order to expand the driver's field of view and thereby increase safety. The first of such additional mirrors was placed on the left side of the vehicle (the driver s side), externally thereof, and situated as to enable the driver to look into the mirror to obtain a better rearward view of the roadway generally to the left of the vehicle. The second of such additional mirrors was placed on the right side of the vehicle (the front passenger's side), externally thereof, and situated as to enable the driver to look into that mirror to obtain a rearward view of the roadway generally to the right of the vehicle.

The interior (or inside) mirror is, generally, the driver's primary rear view mirror; however, the viewing angle of such inside mirror is significantly limited so that relatively large areas, to both sides of the vehicle, remain unseen by the driver. (Such unseen areas may be considered as "blind zones".) Therefore, if the driver relies exclusively on the inside mirror (for providing a rear view), another vehicle, which is not within the peripheral vision of the driver, may actually be within such a blond zone and, consequently, not seen by the driver who, then, may conclude that there is no other vehicle. Such an erroneous conclusion, in turn, may result in both bodily and property injuries if the driver should execute a vehicular maneuver which is inconsistent with the actual vehicular traffic conditions. The prior art, in an attempt to remedy the aforestated conditions and problems, added the said left and right external (outside) mirrors to enlarge the driver's rearward field of view and not require the driver to turn the driver's head far to the left or far to the right in an attempt to determine whether any other vehicles were within such blind zones.

Generally, it has been accepted practice to have the right outside mirror of a convex configuration so as to still further expand the rearward field of view for the driver. However, because of such convex configuration, even though the field of view is expanded, the objects appearing in the mirror appear smaller than they would otherwise appear, for example, in a flat plane mirror. Consequently, the right outside mirror, of convex configuration, may be used by the driver to discern the presence of an object, or other vehicle, to the right side of the vehicle (or in the roadway lane to the right of the vehicle) but cannot be readily and reliably employed by the driver to accurately determine the relative distance of such other vehicle.

Also, it has been accepted practice to have the left outside (driver's side of vehicle) mirror of a planar (flat plane) configuration. Because of such planar configuration, the left outside mirror can be employed for reliably judging the distance of other vehicles rearwardly thereof. Often the driver employs the left outside mirror in an attempt to see if any other vehicle is within the blind zone (generally to the left and rearwardly of the driver's vehicle) which exists because of the limitations of the said inside mirror. However, this is a dangerous practice because of the left outside mirror (of only single flat plane configuration) still leaves a blind zone in which another vehicle may be situated and therefore not be visible to the driver even though the driver may believe to the contrary. The prior art has attempted to solve this problem by adding a relatively small convex mirror onto the otherwise single plane left outside mirror. As an example of such prior art, a 1.5 to 2.0 inches diameter convex mirror may be suitably attached to the surface of the single plane left outside mirror as with an adhesive. However, such "add-on" convex mirrors do not really solve the problems in that the distance of another vehicle, viewed in the "add-on" convex mirror, cannot be readily accurately determined and, further, such "add-on" convex mirror reduces the field of view of the flat plane mirror to which it is attached.

Accordingly, the invention herein disclosed is primarily directed to the problems created by prior art rear view mirror blind zones and to the solution thereof as well as other related and attendant problems.

SUMMARY OF THE INVENTION

In one aspect of the invention, a mirror structure for use as a rear view mirror for an automotive vehicle and the like, comprises a main viewing mirror portion having a main reflective surface of flat planar configuration for viewing therein existing conditions of traffic, and an auxiliary viewing mirror portion having an auxiliary reflective surface of flat planar configuration for viewing therein a portion of said vehicle, wherein the plane of said main reflective surface and the plane of said auxiliary reflective surface are inclined with respect to each other so that when said portion of said vehicle is viewed in said auxiliary viewing mirror portion the view seen in said main viewing mirror portion is outwardly away from said vehicle and does not include said portion of said vehicle.

In another aspect of the invention, a remote control mirror assembly comprises mirror means selectably positionable by an operator, support means for supporting said mirror means, positioning means operatively connected to said mirror means and effective to rotationally position said mirror means with respect to said support means, control means situated remotely from said mirror means and operatively connected to said positioning means, said control means being adapted for actuation by said operator, said control means being effective upon being actuated by said operator to cause said positioning means to rotationally position said mirror means with respect to said support means to a position selected by said operator, additional control means adapted for actuation by said operator for causing said mirror means to become angularly displaced by a preselected angular extent from said position selected by said operator, wherein said positioning means comprises electric motor means, wherein said control means comprises first electric switch means electrically connected to said electric motor means, wherein said additional control means comprises second electric switch means electrically connected to said electric motor means, wherein said first electric switch means is effective for energizing said electric motor means so as to have said electric motor means rotationally position said mirror means to said position selected by said operator, wherein said second electric switch means is effective for energizing said electric motor means so as to have said electric motor means cause said mirror means to become angularly displaced by said preselected angular extent from said position selected by said operator, sensing means responsive to indicia of the revolutions of said electric motor means during the time said electric motor means is causing said mirror means to become angularly displaced, wherein said sensing means is effective to cause de-energization of said electric motor means upon sensing the occurrence of a preselected number of said revolutions which corresponds to said preselected angular extent, wherein said sensing means comprises electronic control unit means, wherein said electronic control unit means senses ripple-like pulses in the current flow to said electric motor means during energization of said electric motor means caused by said second switch means, wherein the number of ripple-like pulses is directly proportional to the angular displacement of said mirror means, and wherein upon said electronic control unit means sensing the occurrence of that number of ripple-like pulses which corresponds to said preselected angular extent said electronic control unit ceases further energization of said electric motor means.

BRIEF DESCRIPTION OF THE DRAWINGS

In the drawings, wherein for purposes of clarity certain details may be omitted from one or more views:

FIGS. 11-A and 11-B are schematic circuit diagrams of circuitry employable in the practice of the invention with such being employed, in whole or in part, with the invention as depicted in FIG. 10;

DETAILED DESCRIPTION OF THE PREFERRED EMBODIMENTS

Figure 1:
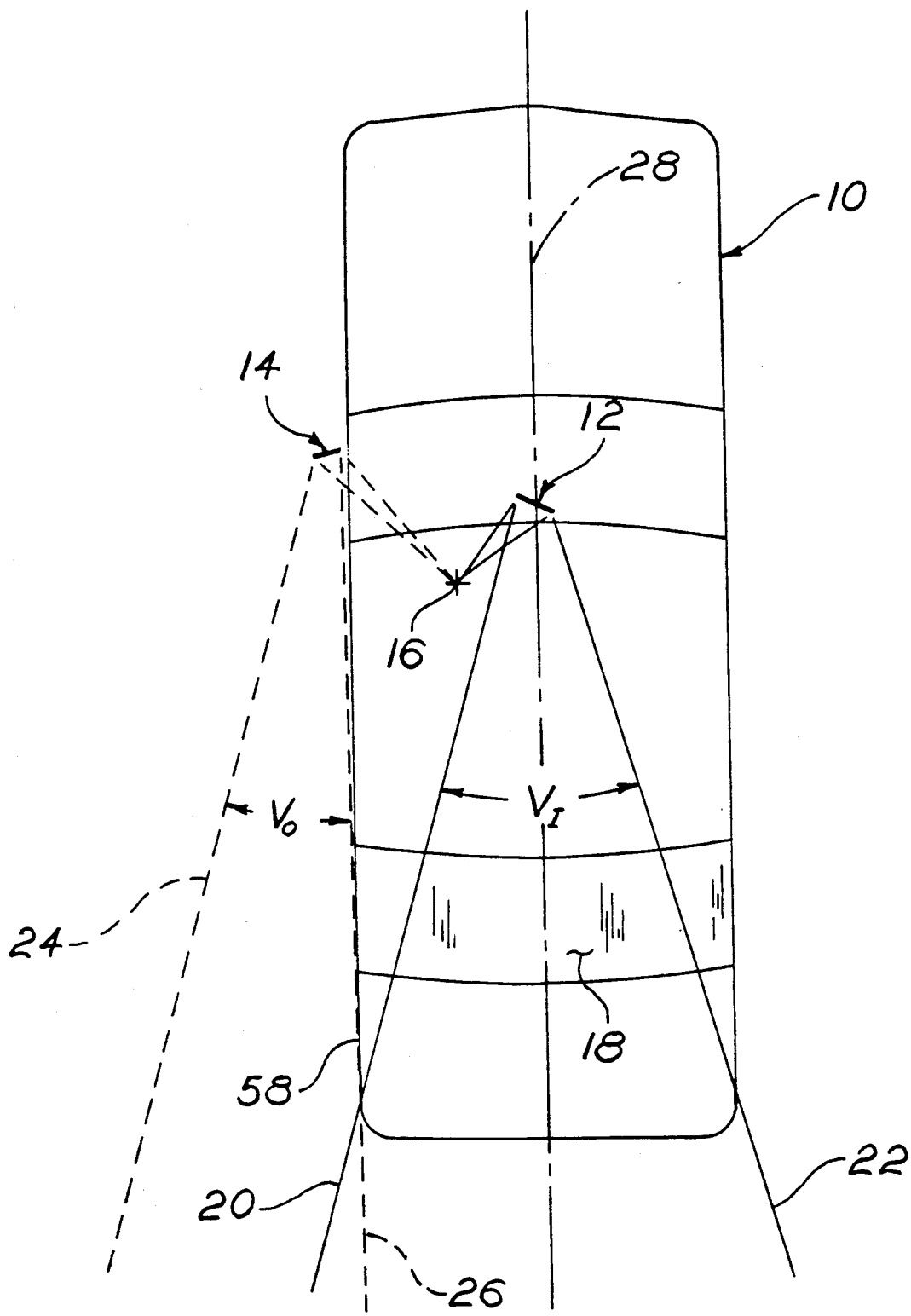
FIG. 1 is a top plan view of a simplified depiction of an automobile, provided with inside and left outside rear view mirrors, and further depicting the usual viewing angles thereof as practiced by the prior art.

Referring now in greater detail to the drawings, FIG. 1, in top plan view, depicts a vehicle, in this instance an automobile 10, having an inside mirror 12 and an outside mirror 14. The driver's eyes are represented as being centered at a point 16. By employing the inside mirror 12, the driver can look toward the rear of the vehicle 10, through the rear window 18 of vehicle 10, with a horizontal viewing angle of $V_I$ degrees FIG. 1 as bounded by and between lines 20 and 22. This, of course, assumes that none of the vehicle's structure interferes with or comes within such viewing angle of $V_I$ degrees. Using the outside mirror 14, the driver is able to look rearwardly with a horizontal viewing angle of $V_O$ degrees depicted in FIG. 1 as bounded by and between dash-lines 24 and 26. The drawing of FIG. 1 is, in effect, a simplification of the actual viewing process by the driver.

Figure 2:
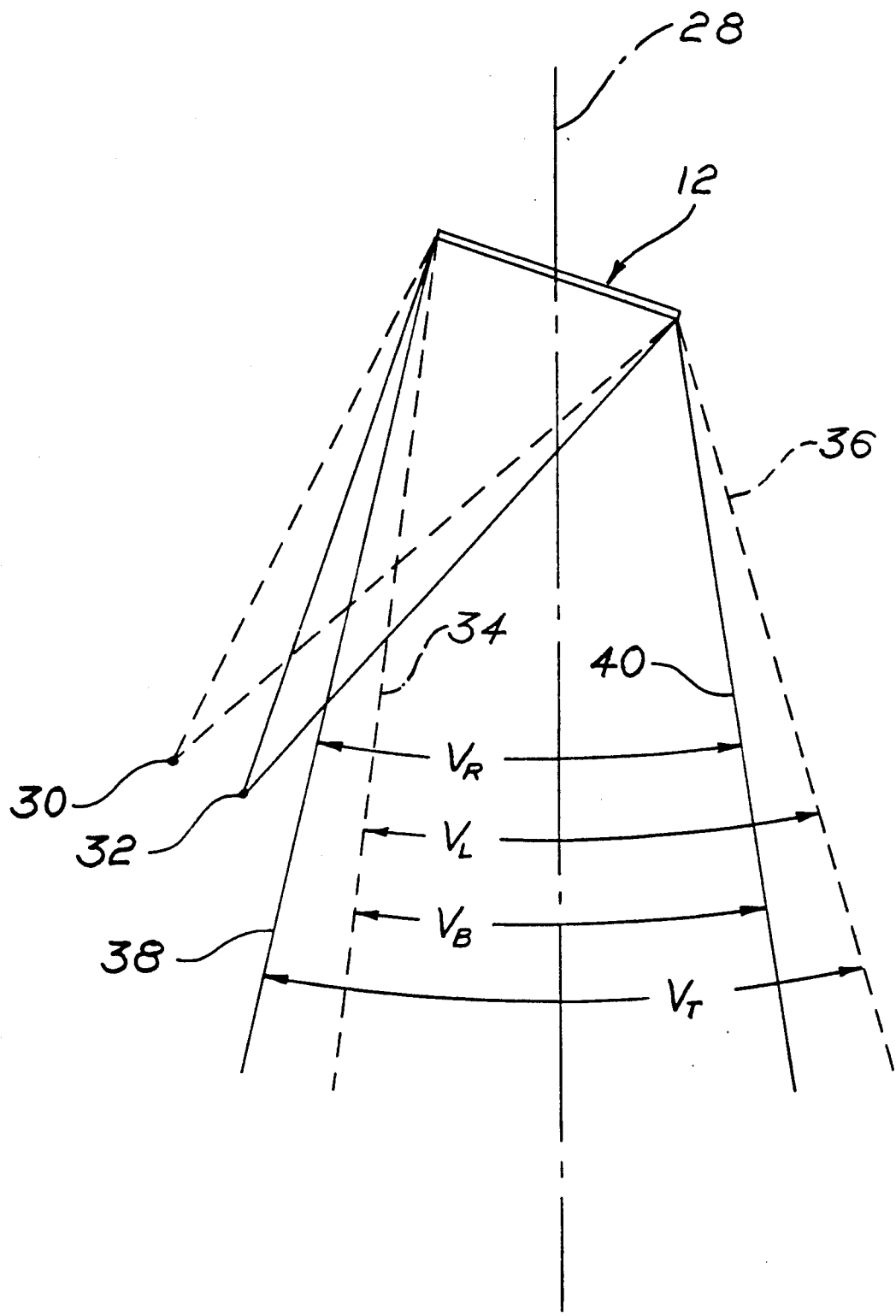
FIG. 2 is a ray diagram illustrating the binocular viewing as would occur by the vehicular driver looking into the view presented by the inside rear view mirror of a vehicle.

FIG. 2 illustrates in greater detail how the driver of the vehicle 10 actually uses the inside mirror 12. Referring in greater detail to FIG. 2, the line 28 represents the longitudinal axis of the vehicle 10 and points 30 and 32 represent the diver's left and right eyes, respectively. The inside mirror 12 is illustrated as having been slightly rotated as to provide a rearward view which is generally centered through the rear window 18 of the vehicle 10. Even though the respective depicted positions of the driver's eyes, 30 and 32, would indicate that the driver's head is turned slightly toward "mirror 12, the driver's head may be facing directly forward.

In FIG. 2, the dash-lines 34 and 36 represent rays of light, from the widest horizontal locations, which can reach the driver's left eye 30 and, therefore, the horizontal viewing angle of $V_L$ degrees of the driver's left eye 30 is bounded by and between such dash-lines 34 and 36. Similarly, lines 38 and 40 represent rays of light, from the widest horizontal locations, which can reach the driver's right eye 32 and, therefore, the horizontal viewing angle of $V_R$ degrees of the driver's right eye 32 is bounded by and between such lines 38 and 40. It should be noted that, as depicted in FIG. 2, the viewing angles $V_L$ and $V_R$ overlap each other, in the medial region, thereby producing a binocular viewing angle of $V_B$ degrees, bounded by and between dash-line 34 and line 40, in which true depth perception is possible. On either side of the binocular viewing angle of $V_B$ (as between line 38 and dash-line 34 and as between line 40 and dash-line 36) the driver is still able to view objects, even though only monocularly, thereby having a total viewing angle of $V_T$ degrees bounded by and between line 38 and dash-line 36.

Figure 3:
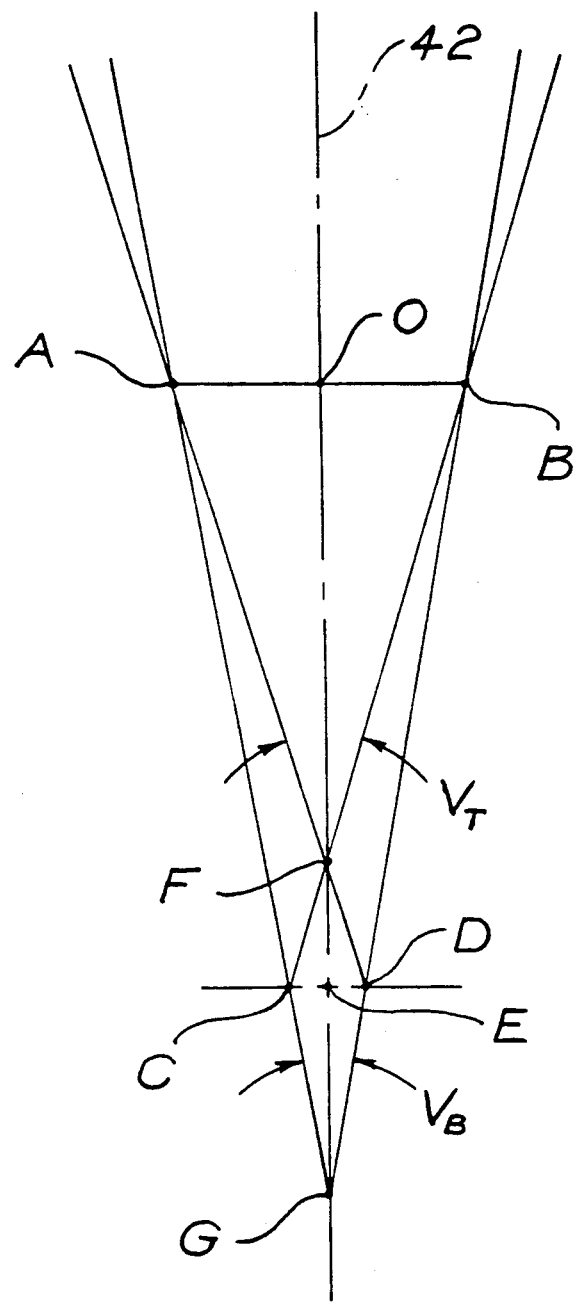
FIG. 3, a diagram, is a geometrical simplification of the drawing of FIG. 2.

The various viewing angles can be calculated in terms of the width of the mirror (as mirror 12), the distance from the driver's eyes to the mirror and the interpupillary distance of the driver's eyes. FIG. 3 geometrically depicts a mirror (such as 12) and the driver's eyes (such as 30 and 32) axially aligned with each other with such being done merely so that the geometric relationships therebetween can be more easily understood.

In FIG. 3: the line from point A to point B represents the width of the mirror (as for example mirror 12); the line from point C to point D represents the interpupillary distance as measured on the axis of the eyes (as between driver eyes 30 and 32); at the midpoint of line $\overline{AB}$ is point 0; at the '-( midpoint of axis or line $\overline{CD}$ is point E; and the line between points E and 0, normal to line AB and line $\overline{CD}$, represents the distance between the mirror (as for example mirror 12) and the axis of the eyes (as for example driver's eyes 30 and 32). Also, the respective viewing rays, in FIG. 3, are carried or extended through the mirror (line $\overline{AB}$) as if the mirror were an aperture through which the eyes (at points C and D) were looking.

In FIG. 3, the angle described by the lines interconnecting points A, F and B (angle AFB) defines the total viewing angle $V_T$ while the angle described by the lines interconnecting points A, G and B (angle AGB) defines the binocular viewing angle $V_B$. In the illustration of FIG. 3, point G is determined by the intersection of the lines or viewing rays passing through and extending beyond points B and D. Such intersection, of course, occurs on the centerline 42 which passes through points 0, F and E. An analysis of the diagram of FIG. 3 shows that:

$$V_T = 2\tan^{-1} \frac{\overline{AB} + \overline{CD}}{2\,\overline{EO}} \quad \text{(Equation No. 1)}$$

and $$V_B = 2\tan^{-1} \frac{\overline{AB} - \overline{CD}}{2\,\overline{EO}} \quad \text{(Equation No. 2)}$$

The above Equations No. 1 and No. 2 illustrate that the following relationships exist:
1. The wider the mirror (distance $\overline{AB}$), the wider is the total viewing angle, $V_T$.
2. The closer (distance $\overline{EO}$) the eyes are to the mirror, the wider is the total viewing angle, $V_T$.
3. The greater the interpupillary distance ($\overline{CD}$), the wider is the total viewing angle, $V_T$.
4. The greater the interpupillary distance ($\overline{CD}$) the narrower is the binocular viewing angle, $V_B$.

The said Equations No. 1 and No. 2 apply to any mirror. In, for example, an automobile, the primary determinants of or the factors in establishing the viewing angles obtained from the mirrors (both inside and outside) are: the placement of the mirrors; the respective widths of the mirrors; and the position or location of the driver as gauged along the seat track of the vehicular driver's seat. Generally, it is accepted practice to have the inside mirror (such as 12) about 8.0 inches wide and the outside mirror (such as 14) about 5.5 inches wide. The eyes of the average driver may be assumed to be approximately 18.0 inches away from the inside mirror and approximately 25.0 inches away from the outside mirror. Further, the eyes of a relatively short driver may be approximately 4.0 inches closer to each of the inside and outside mirrors while the eyes of a relatively tall driver may be approximately 4.0 inches further away from each of the inside and outside mirrors.

The following table is established as a result of placing the above representative sizes and distances into said Equations No. 1 and No. 2, with the distance $\overline{CD}$ (interpupillary distance) being considered a constant equal to 2.75 inches.

| Driver Height | OUTSIDE MIRROR $\overline{AB}$ = 5.5 inches | | | INSIDE MIRROR $\overline{AB}$ = 8.0 inches | | |
|---|---|---|---|---|---|---|
| | Short | Average | Tall | Short | Average | Tall |
| $\overline{EO}$ Inches | 21 | 25 | 29 | 14 | 18 | 22 |
| $V_T$ | 22.2° | 18.7° | 16.2° | 42.0° | 33.3° | 26.7° |
| $V_B$ | 7.5° | 6.3° | 5.4° | 21.2° | 16.6° | 13.6° |

The preceding table discloses what may be considered as
1. for the inside mirror, the total viewing angle, $V_T$, is about twice that of its binocular viewing angle, $V_B$;
2. for the outside mirror, the total viewing angle, $V_T$, is about three times that of its binocular viewing angle, $V_B$;
3. the total viewing angle, $V_T$, of the inside mirror is about twice the total viewing angle, $V_T$, of the outside mirror; and
4. that short drivers gain almost 50.0% in both total and binocular viewing angles as compared total drivers.

Generally, binocular viewing, in itself, is not of great significance in that the vehicular driver effectively uses both the binocular and monocular regions of the total viewing angles and is unaware of the transition between the two regions. Further, not only do two eyes greatly increase the total viewing angle but also the driver's head motion can be used to change the viewing direction.

Figure 4:
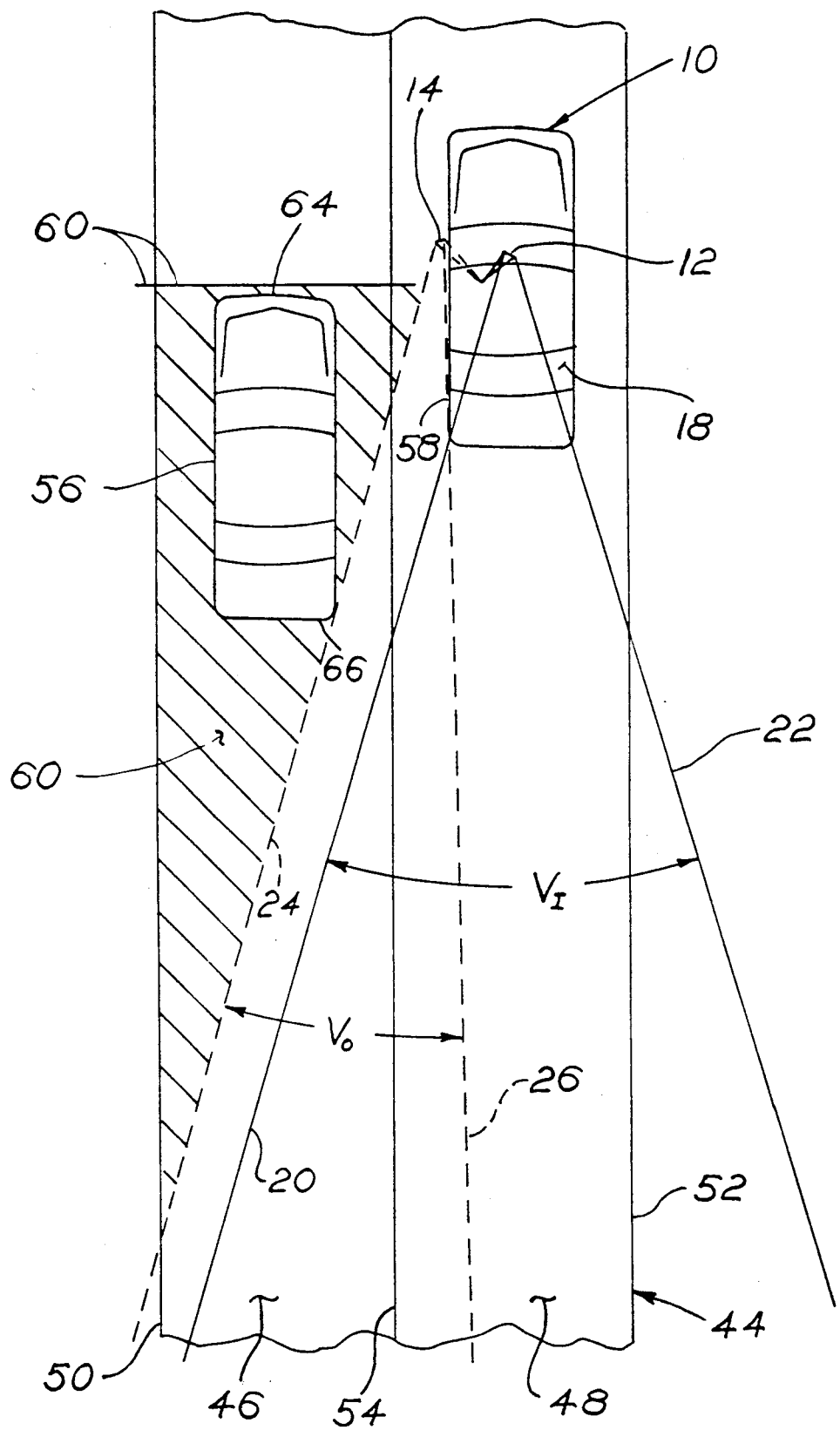
FIG. 4 is a top plan view of two automotive vehicles traveling in the same direction upon a common roadway but respectively in separate parallel lanes thereof and with the right-most vehicle employing its rear view mirrors as practiced by the prior art.

FIG. 4 depicts the viewing angles, with the magnitude of such viewing angles being calculated for an average height driver, for the vehicular inside and outside mirrors as they are usually employed in prior art practice.

Referring in greater detail in FIG. 4 a roadway 44 is shown as comprising two traffic lanes 46 and 48. The widths of such lanes are depicted by parallel lines 50 and 52 with a common medial line 54. A first vehicle, as automobile 10, is traveling in and on lane 48 while a second vehicle (as an automobile) 56 is traveling in and on lane 46 and in the same direction as vehicle 10. It should be mentioned that the drawing of FIG. 4 is generally proportioned as to represent what could be considered so mid-sized automobiles traveling on traffic lanes each of which would be approximately 12.0 feet wide.

As depicted in FIG. 4, in customary prior art usage or practice (and as previously generally discussed with reference to FIG. 1), the inside mirror 12 is adjusted by the driver to approximately center the viewing angle, as depicted by lines 20 and 22, about the longitudinal axis 28 (FIG. 1) of the vehicle 10. The outside mirror 14 is usually adjusted so that the viewing angle the of just "picks-up" or includes a portion of the same side of the vehicle, rearwardly of the mirror 14. More specifically, as depicted in both FIGS. 1 and 4, when the outside mirror 14 is thusly adjusted, an customary prior art usage, one side of the viewing angle thereof, as represented by dash-line 26, includes within such view a portion, as at 58, of the vehicle 10.

Further, in FIG. 4, a transverse line 60 generally normal to the lanes 46 and 48 as well as to vehicle 10, is employed to represent the limit of the peripheral vision of the driver in vehicle 10 facing and looking forwardly) the driver of vehicle 10 does not have a view angularly outwardly of dash-line 24 and since such driver's peripheral vision does not extend rearwardly of the peripheral vision line 60, a blind zone is created as between and extending to peripheral vision line 60 and dash-line 24. This blind zone is depicted by a series of parallel lines all at approximately 45° with respect to the lanes 46 and 48 and extending generally from dash-line 24 to peripheral vision line 60. Such blind zone is designated by reference number 62 and, as is illustrated, the second traveling vehicle 56 is within such blind zone 62 in that the forward-most portion 64 of vehicle 56 is rearwardly of the peripheral vision line 60 while the rearward portion 66 of vehicle 56 is generally forward of the limit (dash-line 24) of the total viewing angle of vehicle 10. Consequently, under the conditions discussed and illustrated, the driver of vehicle 10 would be unaware of the existance of vehicle 56 within such blind zone 62.

The inside mirror is the primary rear viewing mirror since it covers the widest angle and looks into areas which the outside mirror is unable to view. The left outside mirror is used primarily to look into the traffic lane on the left to observe vehicles that are out of view of the inside mirror. However, as shown in FIG. 4, the customary prior art practice renders the outside mirror considerably unreliable, for its intended purpose, and relatively useless for such purpose. That is, as should now become apparent, the customary prior art practice results in a large blind zone existing on the left side of the vehicle and when such vehicle should change lanes of travel, as from the right lane 48 to the left lane 46, the outside mirror provides insufficient information, to the driver of such vehicle, to assure a safe lane changing maneuver. Unfortunately, many, if not most, drivers of vehicles are unaware of the hazard involved in relying on the outside mirror for lane-change information under customary prior art practice. mirror 14, in customary prior art practice, is insufficient.

However, it has been discovered that the outside mirror 14 can be employed in such a manner whereby the blind zone 62 is so altered or modified as to, in effect, eliminate the hazards created by such blind zone 62 of FIG. 4. This discovery, in its broad sense, comprises the turning of the outside mirror 14 farther outward as to have its viewing angle, $V_O$, effectively look into the blind zone 62. This is generally depicted in FIG. 5.

Figure 5:
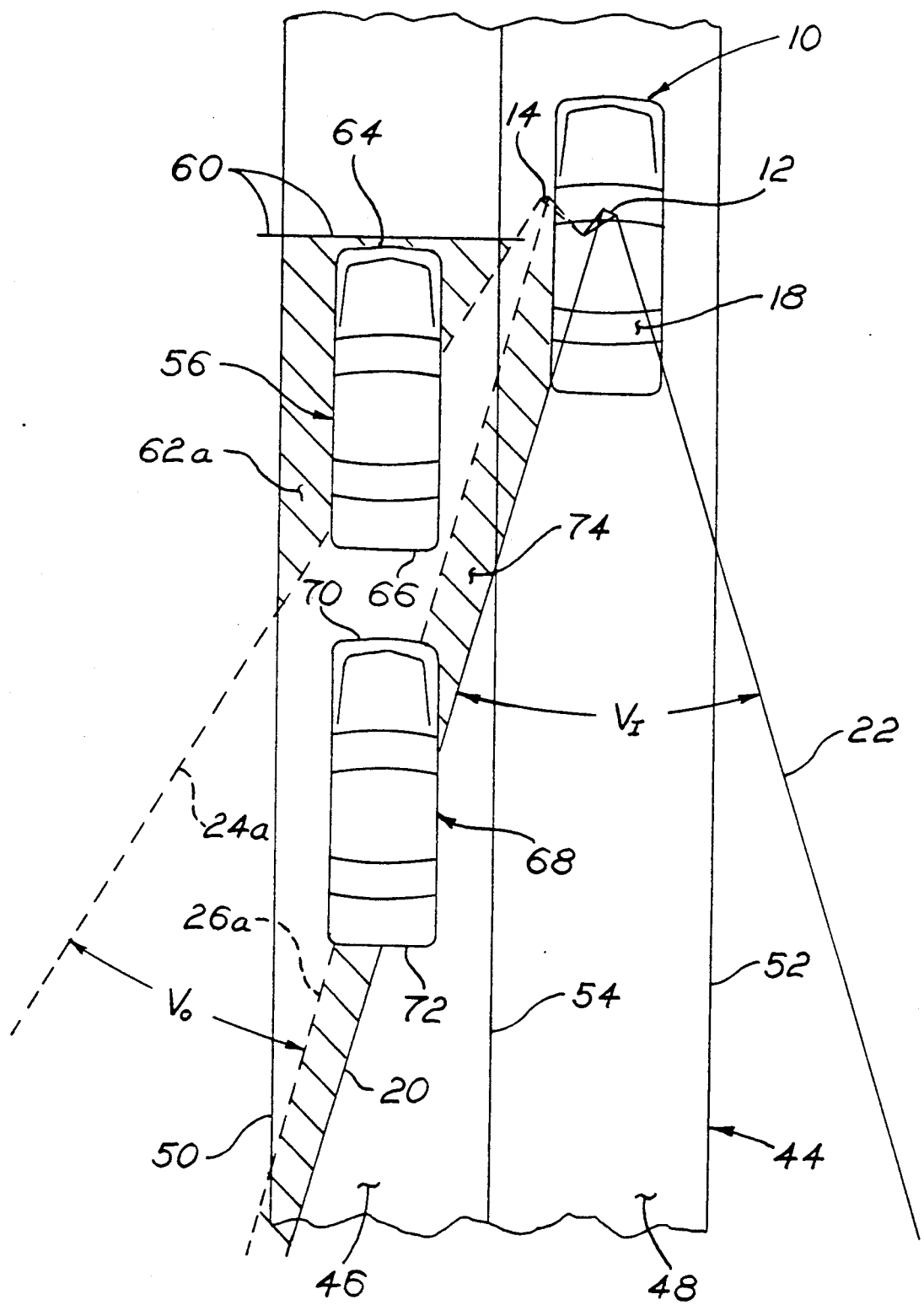
FIG. 5 is a view similar to that of FIG. 4 but with an added automotive vehicle and depicting another operational condition with the left outside mirror positioned in accordance with the teachings of this invention.

In FIG. 5, all elements which are like or similar to those of FIG. 4 are identified with like reference numbers except that each of dash-lines 24 and 26 (depicting the limits of the outside mirror viewing angle) have a suffix "a" added thereto to indicate the further turned-out viewing angle, $V_O$, of the outside viewing mirror 14 and reference number 62 has been provided with a suffix "a" to indicate the consequent reduction in the blind zone 62 of FIG. 4. Further, a third vehicle 68 has been added to the roadway 44 and placed onto lane 46 rearwardly of vehicle 56 to even further illustrate the benefits of further outwardly turning outside mirror 14.

As can be seen in FIG. 5, as a consequence of turning the outside mirror 14 farther outwardly the related viewing angle, $V_O$, is also swung outwardly drastically reducing the area or magnitude of the blind zone 62, of FIG. 4, to a relatively small blind zone 62a of FIG. 5. The outside mirror 14 may be turned farther outwardly (as compared to FIG. 4) even to the degree whereby a secondary blind zone 74 is created with such blind zone 74 existing and extending between the view limit dash-line 26a (of newly positioned viewing angle $V_O$) and the view limit line 20 (of the inside mirror viewing angle $V_I$). Therefore, even though the forward-most portion 64 of the vehicle 56 is still rearwardly of the peripheral vision line 60, the driver of vehicle 10 is now able to discern the presence of vehicle 56 in such a relative location because the rearward portion 66 of vehicle 56 now extends into the viewing angle, $V_O$, rotated to its position as defined by the area included between dash-lines 24a and 26a. Further, even though a secondary blind zone 74 may be created, the width of such is so narrow that a second vehicle 68, in lane 46, will also be visible to the driver of vehicle 10. As should be apparent from FIG. 5, there is no relative position or location which vehicle 68 can assume without the driver of vehicle 10 still being able to see it. For example, as depicted in FIG. 5, the forward portion 70 of vehicle 68 is generally forwardly of dash-line 26a (one of the limits of viewing angle, $V_I$, of inside mirror 12) and therefore visible to the driver of vehicle 10 in inside mirror 12 thereof. As should now be apparent, in the arrangement of the rotated outside mirror 14 of FIG. 5, any vehicle in the left lane 46 is always in view of either the inside mirror 12, the outside mirror 14 or the driver's (vehicle 10) eyes because of being at least partially forward of the peripheral vision line 60. With the outside mirror 14 adjusted as depicted in FIG. 5, the driver of vehicle 10 may safely maneuver from the right lane 48 and onto the left lane 46 if such driver first looks into the inside mirror 12, to see if another vehicle is already partly or wholely in the left lane 46, and then looks into the outside mirror 14 to see if another vehicle, as for example vehicle 56, may be in the left lane 46.

However, with prior art outside type rear view mirrors, there is, to say the least, a problem in attempting to adjust the outside mirror 14 to a position as depicted in FIG. 5 because the driver of such vehicle 10 has no frame of reference by which the driver can determine that the outside mirror 14 has been adjusted outwardly the proper amount. That is, most drivers have been taught to adjust the outside mirror 14 so that the driver can see just a portion of that same side of the vehicle in the viewing angle, $V_O$, of the outside mirror 14; therefore, seeing the side of the vehicle 10 in the inner edge of the viewing angle, $V_O$, of the outside mirror provides a point or frame of reference. However, if the driver of vehicle 10 were to rotate the outside mirror 14 outwardly, in an attempt to obtain a field of view, as depicted in FIG. 5, the prior art outside mirror would cease to show such a reference (the portion of the side of vehicle 10) and the driver would become confused as to exactly where he was seeing when he looked into the thusly outwardly positioned outside mirror 14.

Figure 7:
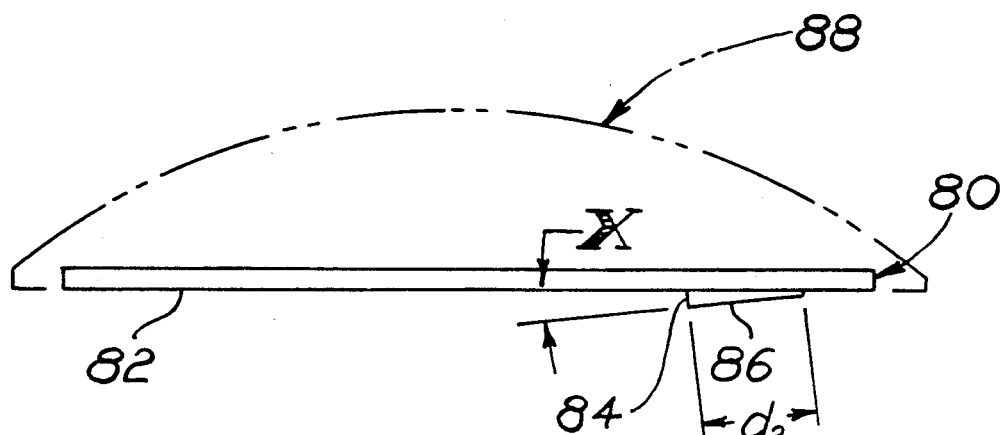
FIG. 7 is a view taken generally on the plane of line 7—7 of FIG. 6 and looking in the direction of the arrows.
Figure 6:
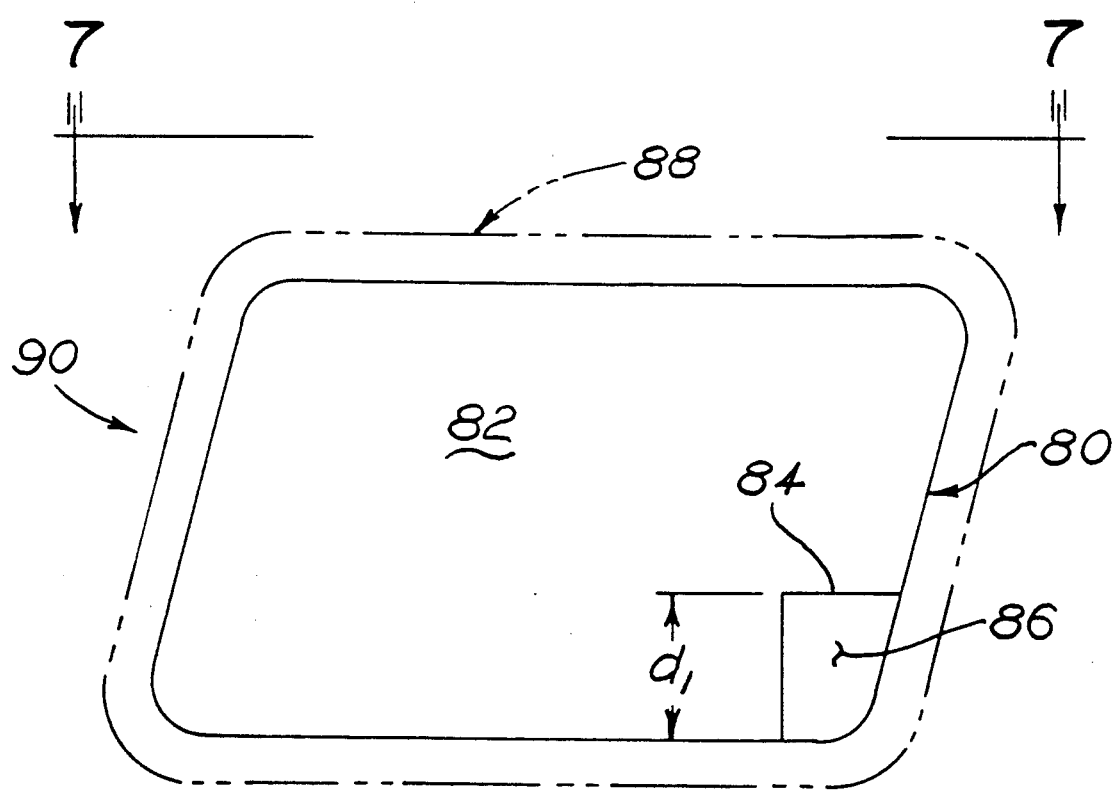
FIG. 6 is a view of a mirror embodying teachings of the invention.

FIGS. 6 and 7 illustrate a mirror employing teachings of the invention. Referring in greater detail to FIGS. 6 and 7, an outside mirror 80, preferably of a flat planar mirror surface as at 82, with a relatively small auxiliary or referencing mirror 84 carried thereby. Again, preferably, the small mirror 84 has a flat planar mirror surface 86. The mirror surface 82 may be considered as the main viewing mirror while mirror surface 86 is situated at an angle, X, with respect to the plane of main viewing mirror 82. In the preferred embodiment, the magnitude of such angle, X, would be half of the total angle by which the viewing angle $V_O$ of either FIG. 1 or FIG. 4 would have to be rotated in order to attain a relative position as that depicted by viewing angle $V_O$ in FIG. 5. It has been determined that presently, for most automotive vehicles, the angular rotation necessary to rotate the viewing angle $V_O$ of such mirror 14 from its depicted position in either FIGS. 1 or 4 to its depicted position in FIG. 5 is about 15.0°. Therefore, in such situations the magnitude of said angle, X, would be about 7.5°. Further, if a mirror configuration in accordance with the invention were to be standardized for all vehicles, it could be that said angle, X, would be in the order of 7.5°. It has also been found that the auxiliary or gauging mirror 84 will function as desired with a height, $d_1$, thereof in the order of 1.0 inch and a width, $d_2$, thereof in the order of ⅜ inch. Preferably, the auxiliary mirror 84 is carried by mirror 80 as to be at a location generally closest to the vehicle and at a generally lowermost portion of the mirror 80. This then provides the vehicle driver with the greatest uninterrupted view, in main mirror 82, of the roadway.

Still with respect to FIGS. 6 and 7, the mirrors 80, 82 and 84, 86 may be either front surface or second surface mirrors Generally, in the automotive field, the mirrors are usually front surface mirrors produced as by the vacuum deposition of chromium on glass. Further, the practice of the invention is not limited to either the employment of a main mirror 80 of generally parallelogram configuration or to the precise configuration of the auxiliary mirror 84 as generally depicted in FIG. 6. Also, even though in the preferred embodiment auxiliary mirror 84 would be carried by main outside mirror 80 as by having the auxiliary mirror 84 a separate member and suitably secured to the main mirror 80 as by, for example, an adhesive, the auxiliary or gauging mirror 84 may be integrally formed with main mirror 80.

Figure 8:
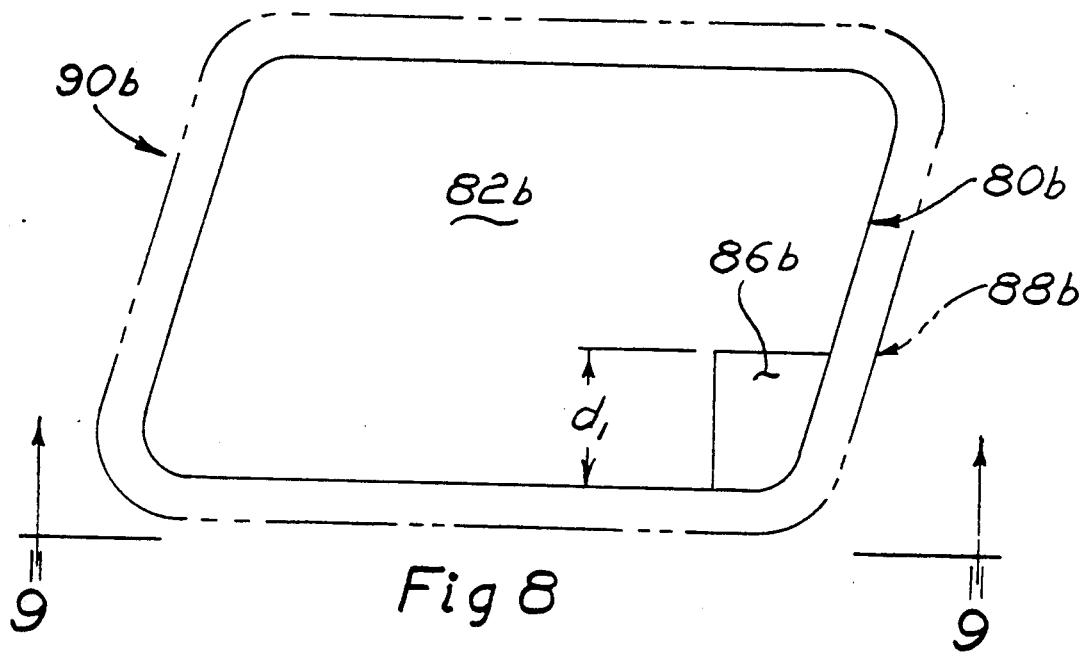
FIG. 8 is a view of another mirror embodying teachings of the invention.
Figure 9:
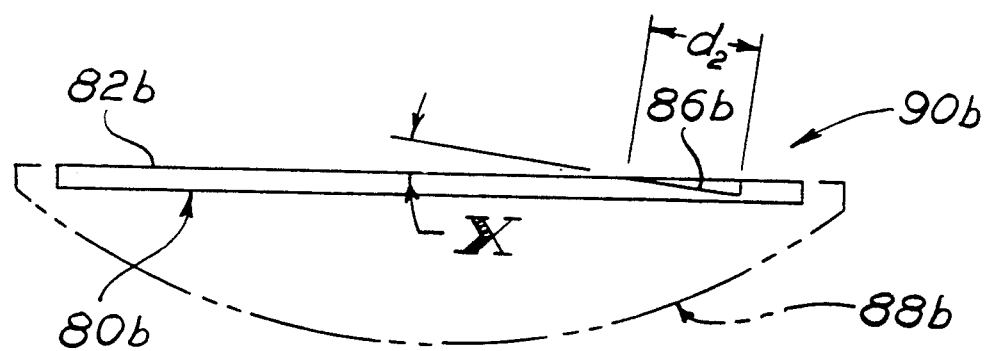
FIG. 9 is a view taken generally on the plane of line 9—9 of FIG. 8 and looking in the direction of the arrows.

FIGS. 8 and 9 illustrate another embodiment of an outside mirror employing teachings of the invention. All elements in FIGS. 8 and 9 which are like or similar to those of FIGS. 6 and 7 are identified with like reference numbers provided with a suffix "b", with the exception of angle, X, and dimensions $d_1$ and $d_2$ which are not provided with any suffix. In the main, the embodiment of FIGS. 8 and 9 differs from that of FIGS. 6 and 7 by having the auxiliary or referencing viewing mirror 86b ground into or otherwise formed into the main body or glass of outside mirror 80b. The embodiment of FIGS. 8 and 9 would be preferred if the overall mirror were to be a front surface mirror produced as by the vacuum deposition of chromium on glass. Further, all relationships and characteristics hereinbefore discussed with reference to the embodiment of FIGS. 6 and 7 apply equally well to the embodiment of FIGS. 8 and 9.

It should be made clear that the mirrors 80 and 80b (respectively of FIGS. 6 and 7 and FIGS. 8 and 9) may be employed in any overall mirror assembly. That is, referring in particular to FIGS. 6 and 7, the mirror 80 may be mounted in or carried by any suitable housing and/or carrier means depicted in simplified form and in phantom line at 88 of both FIGS. 6 and 7. Such, in turn, may be considered an overall mirror assembly 90. In this regard, the mirror assembly 90 may be of the type which is suitably pivotally mounted outside of the vehicle and requiring the driver to manually grasp the mirror assembly 90 in order to adjustably position it in a selected attitude. Also, the mirror assembly 90 may be of the type which is often referred to as being a remote manually adjustable mirror (one such structure is shown by U.S. Pat. No. 3,407,684). That is, as is well known in the art, while the mirror assembly 90 would be mounted outside of the vehicle, the driver is provided with a joystick, or some other control, situated within the vehicle, which is operatively connected to the mirror as by bowden wires or cables so that when the joystick is operated by the driver, the motion thereof is transmitted to the mirror for the remote movement and positioning of such mirror. Still further, the mirror assembly 90 may be of the type which is often referred to as being a remote electrically (or power) adjustable mirror. With such, as is well known in the art, the mirror assembly 90 would be mounted outside of the vehicle while suitable related electrical control means (which may be of the joystick type) is situated within the vehicle. Electric motors are provided for causing the mirror as 80, to rotate or pivot about both vertical and horizontal axes to a selected attitude and activation of such electric motors is achieved and controlled by the driver through actuation of the electrical control means. It is believed that in at least the vast majority of such remote electrically adjustable mirror assemblies, the electrical motors and related drive trains are contained within the overall mirror housing which housing remains stationary while the mirror, such as 80, rotates relative to the stationary housing. Accordingly, in practicing the invention, as with the embodiment of FIGS. 6 and 7, in a remote electrically adjustable overall mirror assembly configuration, the electrical drive motors could be fixedly situated as within housing or carrier means 88 and operatively connected to the mirror 80 as to, upon actuation of the electrical control means, rotate the mirror 80 to the selected position or positions.

The foregoing, stated with regard to the embodiment of FIGS. 6 and 7, applies equally well to the embodiment of FIGS. 8 and 9.

Figure 10:
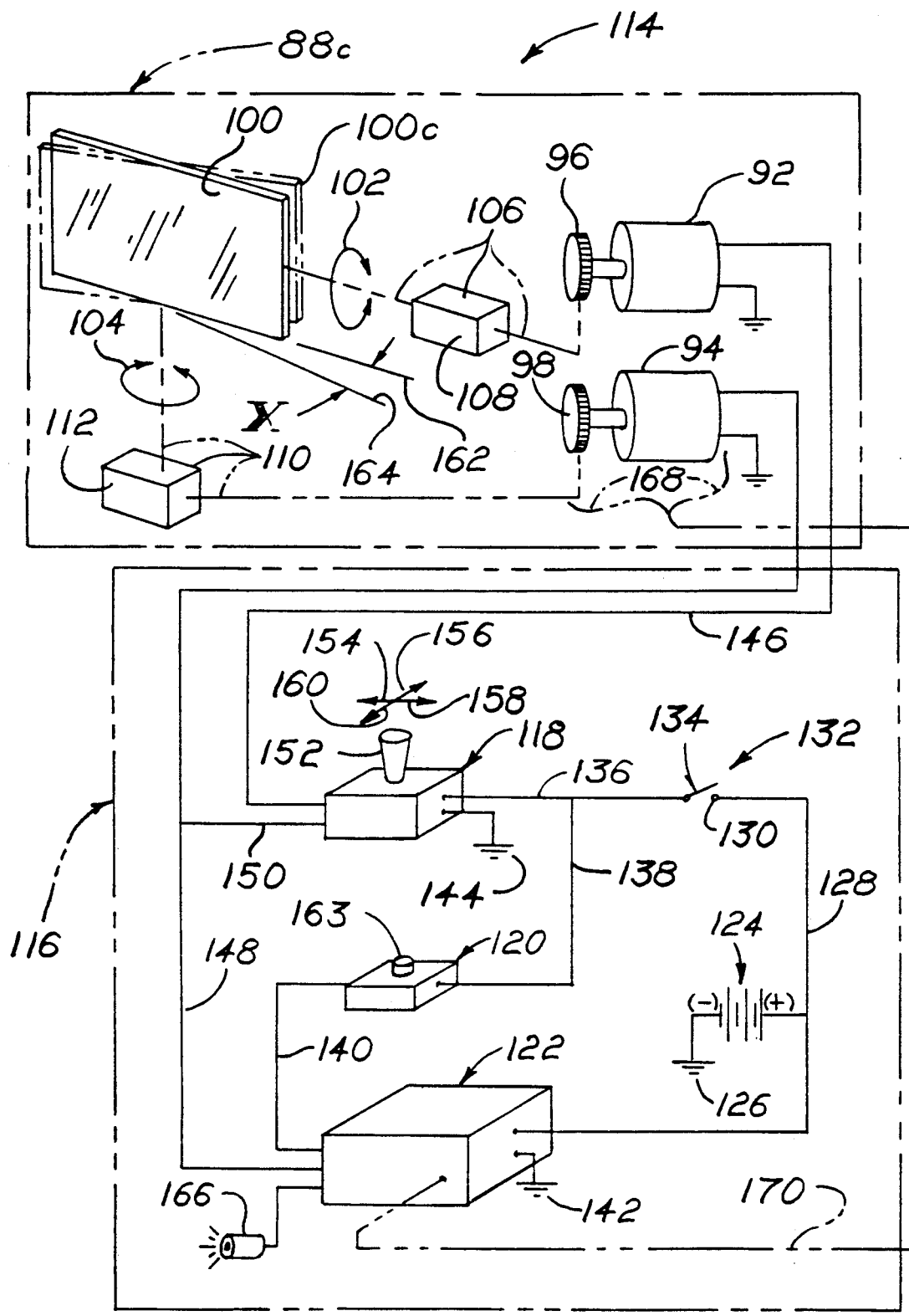
FIG. 10 is a diagrammatical and schematic representation of still further apparatus employable in the practice of the invention.

In addition to the foregoing, the invention can be practiced by yet other means, apparatus and method all of which are intended, from an operating standpoint, to eliminate the hazards of the blind zone 62 as depicted in FIG. 4. Figure 10, illustrates one such other apparatus and method.

Referring in greater detail, FIG. 10 illustrates a pair of electric motors 92 and 94 respectively provided as with suitable gear means 96 and 98. A mirror 100, preferably of flat plane form, is depicted, schematically, as having a horizontal axis of rotational or pivotal motion as generally indicated by arrow 102, and as having a vertical axis of rotational or pivotal motion as generally indicated by arrow 104. Such dual axis motion, of course, can be achieved in a number of ways well known in the art as by, for example, the use of a cross-shaped member with respective bearing surfaces as often employed in universal joint structures.

The gear means 96 is depicted as being operatively connected to mirror 100 as by suitable motion transmitting means 106 which may comprise further gear or threaded shaft means schematically depicted at 108. Such motor means 92 and motion transmitting means 106 are effective for selectively rotating or pivoting mirror 100 in directions as generally indicated by arrow 102 thereby elevating or lowering the scene viewed by the driver.

The gear means 98 is depicted as being operatively connected to mirror 100 as by suitable motion transmitting means 110 which may comprise further gear or threaded shaft means schematically depicted at 112. Such motor means 94 and motion transmitting means 110 are effective for selectively rotating or pivoting mirror 100 in directions as generally indicated by arrow 104 thereby horizontally varying the scene viewed by the driver. As previously described with reference to the embodiments of FIGS. 6 and 8, all of the motion transmitting means 106 and 110, electric motor means 92 and 94 and mirror 100 may be situated as within housing or carrier means, depicted in phantom line at 88c, which may be considered functionally similar or equivalent to the housing or carrier means 88 and 88b. Of course, in the embodiment of FIG. 10, the mirror 100 would be selectively variably positionable with respect to such means 88c. The housing or carrier means 88c, the mirror 100 and the other elements herein identified and illustrated within the bounds of phantom line 88c could be considered an overall electrically positionable mirror assembly 114 which, in turn, would be mounted preferably totally externally of the vehicle as to have the mirror 100 at a location viewable by the driver.

In FIG. 10, the second box-like configuration in phantom line at 116 is intended to depict the associated vehicle and the elements diagrammatically and schematically depicted therewithin may be considered as being situated within the interior of such vehicle 116.

In the preferred embodiment, a- pair of electrical switches or control means 118 and 120 are provided as well as an electronic control unit (ECU) 122. A suitable source of electrical potential 124 is shown as going to ground potential as at 126 and electrically connected as to conductor means 128 which, in turn, is electrically connected to the ECU 122 and to a switch contact 130 of a switch assembly 132 having a switch member 134. The switch assembly 132 is preferably operated in conjunction with the vehicular engine ignition switch assembly (even possibly forming a part thereof) so that, upon closure of the ignition switch assembly by the driver, switch member 134 is closed against contact 130 and a circuit therethrough is completed. A conductor 136 leads as from switch contact 134 to switch or control assembly 118 and associated conductor means 138 similarly completes a circuit as from switch contact 134 to switch or control assembly 120. Additional conductor means 140 electrically interconnects switch assembly 120 and ECU 122. Both the ECU 122 and the switch or control assembly 118 are connected to ground potential as at 142 and 144, respectively.

The electric motor means 92 is electrically connected to the switch assembly 118 via conductor means 146 while electric motor means 94 is electrically connected to both the switch assembly 118 and the ECU 122 via conductor means 148 and branch conductor means 150.

Switch means 118 may be, as is well known in the art, a joystick type control having manually movable lever means 152 which, when moved by the driver in directions as generally indicated by arrows 154, 156, 158 and 160, causes directionally corresponding movement of mirror 100. For example: if control 152 were to be moved in the direction of arrow 154 electric motor means 92 would be energized as to rotate in a direction whereby, through motion transmitting means 106, mirror 100 would be rotated or pivoted as to elevate the scene viewed by the driver; if control 152 were to be moved in the direction of arrow 158 the same electric motor means 92 would be energized as to rotate in an opposite direction whereby, through the same motion transmitting means 106, mirror 100 would be rotated or pivoted in an opposite direction as to lower the scene viewed by the driver; if control 152 were to be moved in the direction of arrow 160 electric motor means 94 would be energized as to rotate in a direction whereby, through motion transmitting means 110, mirror 100 would be rotated or pivoted as to horizontally change the scene viewed by the driver to that further generally horizontally away from the vehicle; and if control 152 were to be moved in the direction of arrow 156 electric motor means 94 would be energized as to rotate in an opposite direction whereby, through the same motion transmitting means 110, mirror 100 would be rotated or pivoted as to horizontally change the scene viewed by the driver to that further generally horizontally toward or closer to the vehicle.

The method of operation and the operation of the embodiment of the invention of FIG. 10 would, preferably, be as follows. With the switch means 132 closed, the driver may choose to first move control means 152 in directions of either arrows 154 or 158 in order to achieve a desired elevation of the scene to be viewed. For purposes of clarity in description, let it be assumed that when the driver so positions the mirror 100 to the driver's desired and selected elevational view, the mirror is in a position as generally depicted in phantom line at 100c. Further, it may be assumed that in such position 100c, too much of the driver's vehicle is actually seen in the mirror. Therefore, the driver would then move control means 152 in the direction of the arrow 160 causing the mirror 100c (through means previously discussed) to rotate or pivot towards a position as depicted in solid line by mirror 100. Further, for purposes of description, let it be assumed that when the mirror is thusly rotated or pivoted to its depicted solid line position, the driver of the associated vehicle sees, within the mirror 100, just a slight portion of such vehicle, as depicted generally at 58 of FIG. 4, and stops further horizontal rotation of mirror 100 as by releasing or returning control means 152 to its null position. For ease of visualization, and subsequent reference, line 162 (an imaginary extension of the mirror 100) depicts such relative position. Then the driver would actuate the switch means 120, which may be a momentary type switch assembly, as by depressing switch button 163, thereby sending an electrical signal to the ECU 122 which, in turn, via conductor means 148, energizes motor means 94 to horizontally rotate mirror 100 to a view further away from the vehicle. Such further outward rotation of mirror 100 continues until a preselected number of additional degrees of relative rotation of the mirror 100 are achieved and, at that time, further outward rotation of the mirror 100 is stopped by the ECU 122. In FIG. 10, line 164 is employed as an imaginary extension of the mirror 100 when it (the mirror) attains a position corresponding to said additional degrees of relative rotation by ECU 122. The angle X, as between lines 162 and 164, would be equivalent to the angle X of FIGS. 7 and 9 and as discussed with reference to the embodiments of FIGS. 6 and 7 and FIGS. 8 and 9. Once the mirror 100 has been thusly rotated to the position of line 164, through the additional angle X the view seen by the driver would be as generally depicted by $V_O$ of FIG. 5 which, as previously described, effectively eliminates the dangerous blind zone 62 of the prior art as depicted in FIG. 4.

In the preferred embodiment, an indicator light or lamp means 166 is provided and becomes energized upon the mirror 100 having been rotated or pivoted through said additional degrees of relative rotation by the action of the ECU 122. The energization of light 166 gives the driver visual indication that the mirror 100 has been rotated through the said additional degrees of relative rotation thereby having the driver know that the driver can trust the mirror's position to be proper and aimed for viewing into the blind zone of the prior art.

Further, still with reference to FIG. 10, in the preferred embodiment, the ECU 122 has electrical power continuously applied to it so that the ECU 122 can retain the memory that it has been actuated for positioning the mirror 100 for viewing into the prior art blind zone 62.

However, the driver is always able to check whether the position of the mirror 100 is correct, especially in the event that someone else has driven the vehicle, simply by again (as hereinbefore described) repositioning the mirror 100 as to see a view of a portion (as 58) of the vehicle and then actuating the switch button 163. The process of repositioning mirror 100, of course, employs the selective actuation of control means 152 and, if such actuation is undertaken and if at the start of such actuation light 166 should being an energized state, such light 166 will become de-energized by the ECU 122 until after the ECU 122 is again called upon to move and does move mirror 100 through the angle X.

In FIG. 10 the switch means 118, switch means 120 and indicator lamp means 166 are illustrated as being separate devices; however, it is contemplated that such could be easily packaged into a unitary type assembly as by, for example, placing the actuating button 163 and indicator lamp means 166 into the extending end of the control member 152.

In order for the ECU 122 to be able to rotate the mirror 100 the additional angular displacement of angle X, the ECU 122 must, in effect, know just how far the mirror 100 has turned (as starting from a reference position 162 towards the desired position 164). One way of achieving this is to control the length of time ("on time") that motor 94 would be energized by the ECU 122 upon initiation of such action by switch means 120. Such, of course, could take the form of an appropriate R-C circuit, or any other timing circuit, within the ECU 122. This approach of controlling the "on time", of course, assumes that there would be no appreciable difference in the rotational speed of the motor 94 throughout all of its operating conditions.

Another way of measuring the amount or degrees of rotation of mirror 100 by motor 94, in response to the energization thereof by ECU 122, is to count the ripple pulses in the current of the drive motor 94. That is, all commutated d.c. motors, of the type employed in remote electrically positioned mirror assemblies, exhibit a ripple in the current and such ripple has a frequency equal to the speed of rotation of the motor multiplied by the number of commutator segments. Such ripples may be sensed (and amplified) directly within the ECU 122 since the current flow to the motor 94, at this time, is being supplied by the ECU 122. In such an arrangement, the number of ripples sensed would be directly proportional to the angular rotation of mirror 100 and, therefore, once the ripple counter associated with ECU 122 sensed the occurrence of that number of ripples (or pulses) which correspond to said desired angle X, ECU 122 would cease further energization of motor means 94.

Yet another way of controlling and/or determining the amount of angular rotation of mirror 100, due to the energization of motor 94 by ECU 122, is to employ any of a number of rotational sensors operatively connected to either the motor 94 or the motion transmitting means 110. Such rotational sensors, many of which are well known in the art, may employ optical, magnetic or electrical means as to monitor and indicate the degrees of rotation of the output shaft of motor 94 and/or the motion transmitting means 110 as by electrical pulses generated in response to such monitored rotation. Such a rotational sensor (or any of such) is schematically depicted as by the phantom line bracket at 168 and the pulses generated therewithin may be transmitted as via suitable conductor means 170 to the ECU 122. Again, in such an arrangement, the number of pulses generated and sensed would be directly proportional to the angular rotation of mirror 100 and, therefore, once the pulse counter associated with ECU 122 sensed the occurrence of that number of pulses which correspond to said desired angle X, ECU 122 would cease further energization of motor means 94.

Still another way of controlling and/or determining the amount of angular rotation of mirror 100, due to the energization of motor 94 by ECU 122, is to employ means for a direct measurement of the horizontally adjusted position of mirror 100. Such direct measurement means may take the form of, for example, a linear potentiometer operatively connected as to the mirror 100 and operationally offset horizontally from the mirror's vertically extending axis of rotation or pivoting. In such an arrangement, the ohmic resistance, provided by the potentiometer, when the driver adjusted the mirror 100 to a zero or reference position, depicted by line 162, would, in effect, constitute a zero or reference value fed to a micro-processor within the ECU 122. The microprocessor, in turn, would require an additional voltage value of, for example, 1.2 volts, from any such driver-established zero or reference value, in order to further move the mirror 100 as from position 162, through angle X, to the automatically properly finally adjusted position of 164 upon actuation of the ECU 122 by the driver depressing button 163 of switch means 120. Of course, as the motor 94 further adjusted mirror 100 through angle X, the voltage across the linearly changing ohmic value of the potentiometer would be fed back to the micro-processor and when the value thereof resulted in a matching of the assumed constant incremental value of 1.2 volts, the ECU 122 would cease further energization of the motor 94 and rotation of mirror 100.

FIGS. 11-A and 11-B illustrate circuitry employable in the practice of the invention with such being employed, in whole or in part, with the invention as depicted in FIG. 10. More particularly, the circuitry of FIGS. 11-A and 11-B, as will become apparent, may be employed as the ECU 122 of FIG. 10.

Generally, with the circuitry of FIGS. 11-A and 11-B, after mirror 100 has been adjusted by the driver so that, for example, the side of the vehicle is just seen, as previously herein described, the driver may select blind zone viewing by simply actuating a momentary electrical switch. As a consequence, the mirror 100 automatically positions itself for blind zone viewing and a signal means, such as an indicator lamp 166, is energized thereby advising the driver that the mirror 100 is in fact properly positioned. If at any time thereafter the driver wishes to have the mirror 100 return (from the blind zone viewing position) to the position where the side of the vehicle is just seen, all that need be done is for the driver to again push the momentary electrical switch with the result that the mirror 100 automatically returns (to the position wherein the side of the vehicle is just seen) and the indicator lamp is de-energized. Also, if the mirror 100 is positioned for blind zone viewing and, at that time, any horizontal actuation of the mirror 100 is undertaken, by use the manually movable control 152, the indicator lamp means 166 becomes de-energized because the position of the mirror 100 can no longer be relied upon.

The circuitry of FIGS. 11-A and 11-B may be considered as comprising three major portions or sections: (a) a ripple current detector which amplifies and shapes the a.c. component of the minor current, as of motor 94, which results from commutation in a permanent magnet d.c. motor; (b) a solid state switching means which energizes the motor, as 94, and controls its direction of rotation; and (c) logic circuitry which responds to several inputs to determine in which direction the motor, as 94, should turn, and, whether the indicator lamp should be energized.

Referring to FIGS. 11-A and 11-B, in greater detail, the circuitry 300 thereof is illustrated as comprising a plurality of gate means 302, 304, 306, 308, 310, 312, 314, 316, 318, 320, 322, 324, 326, 328, 330 and 332. Gate means 330 is depicted as having an input terminal 334 while input terminal means 336 and 338, 340 and 342, 344 and 346, 348 and 350, 352 and 354, 356 and 358, 360 and 362, 364 and 366, 368 and 370, 372 and 374, 376 and 378, 380 and 382, 384 and 386, 388 and 390, and, 392 and 394 are depicted as respectively associated with gate means 302, 304, 306, 308, 310, 312, 314, 316, 318, 320, 322, 324, 326, 328 and 332 which, also, respectively have associated output terminal means 396, 398, 400, 402, 404, 406, 408, 410, 412, 414, 416, 418, 420, 422 and 424 and, similarly, gate means 330 is depicted as having output terminal means 426.

The following chart is intended to set forth the electrical interconnections as between and/or among the gate means of FIG. 11-A.

| CONDUCTOR MEANS | INTERCONNECTS TERMINALS | GATE MEANS |
|---|---|---|
| 428 | 338, 340 | 302, 304 |
| 430 | 396, 346 | 302, 306 |
| 432 | 398, 352 | 304, 310 |

-continued

| CONDUCTOR MEANS | INTERCONNECTS TERMINALS | GATE MEANS |
|---|---|---|
| 434 | 400, 356 | 306, 312 |
| 436 | 402, 358, 360 | 308, 312, 314 |
| 438 | 404, 362 | 310, 314 |
| 440 | 406, 364 | 312, 316 |
| 442 | 344, 406, 364 | 306, 312, 316 |
| 444 | 408, 366 | 314, 316 |
| 446 | 354, 408, 366 | 310, 314, 316 |
| 448 | 410, 368 | 316, 318 |
| 450 | 412, 372 | 318, 320 |
| 452 | 414, 384 | 320, 326 |
| 454 | 416, 390 | 322, 328 |
| 456 | 420, 388 | 326, 328 |
| 458 | 386, 422 | 326, 328 |
| 460 | 342, 420 | 304, 326 |
| 462 | 336, 422 | 302, 328 |
| 464 | 400, 376 | 306, 322 |
| 466 | 404, 382 | 310, 324 |
| 468 | 374, 418 | 320, 324 |
| 470 | 426, 380, 378 | 330, 324, 322 |
| 472 | 424, 370 | 332, 318 |

In addition to the foregoing, terminals 348 and 350 of gate means 308 are respectively electrically connected to one ends of conductors 474 and 476 which, in turn, have their respective other ends electrically connected to the output terminal 478 of an inverter 480 and to a point electrically between a resistor 482 and collector 484 (shown in FIG. 11-B). A conductor means 486 serves to electrically interconnect output terminal means 426, of gate means 330, and input terminal means 488 of inverter 480. Gate means 332 input terminal means 392 and 394 are respectively electrically connected to one ends of conductor means 490 and 492, the other ends of which are connected to the portion of the circuitry 300 shown in FIG. 11-B.

A transistor 684, also shown in FIG. 11-B, has its base electrically connected to conductor means 496 which is electrically connected to output terminal means 406 of gate means 312. The output terminal 410 of gate means 316 is electrically connected, via conductor means 498, to the input of an inverter 502 which, in turn, has its output terminal electrically connected to the circuitry portion of Figure -B as via conductor means 506. A counter 508 has one of its input terminals 510 electrically connected to output 410 of gate means 316, as by conductor means 512, while another input terminal 514 thereof is electrically connected to the circuitry portion of FIG. 11-B as via conductor means 516. Further, conductor means 518 serves to electrically connect the circuitry portion of FIG. 11-B to gate means input terminals and 340 as through conductor means 428 while another conductor means 520 serves to electrically connect the circuitry portion of FIG. 11-B to output terminal 408 of gate means 314.

Still referring to FIG. 11-A, it can be seen that conductor means 448, 472 and 516 respectively comprise resistance means 522, 524 and 526. A diode 528 is placed electrically in parallel to resistance means 522 while capacitor means is placed electrically between input terminal 368, of gate means 318, and electrical ground potential A second capacitor means 532 is placed electrically between ground potential and input terminal 370 of gate 318. A third capacitor 534 is placed electrically between ground potential and terminal 514 of counter 508.

Referring in greater detail to FIG. 11-B, the portion of the circuitry 300 depicted therein is illustrated as comprising first and second terminal means 536 and 538 with terminal 536 being electrically connected to a source of electrical potential 540, preferably the storage battery of the vehicle, and with terminal 538 being connected to ground potential. Terminal means 536 is shown connected to conductor means 542 while terminal means 538 is shown connected to conductor means 544. Conductor means 542 comprises series situated diode means 546 and resistance means 548 while conductor means 544 comprises series resistance means 550 and 552.

A plurality of branch-like circuits or conductors are connected electrically across conductor means 542 and 544. More particularly: (a) a zener diode 554 is connected as at 556 and 558 to conductors 542 and 544; (b) a conductor 560, comprising a normally open momentary switch means 562 and series resistance 564, is connected as at 566 and 568 to conductors 542 and 544; (c) conductor 518, comprising resistance means 570, is connected to conductor 544 as at 572; (d) conductor 506, comprising series resistance means 574 and 576, is connected to conductor 544 as at 578; (e) a conductor 580, comprising resistance means 582 and 584 along with the collector 586 and emitter 588 of an NPN transistor 590, is connected as at 592 and 594 to conductors 542 and 544; (f) a conductor 596, comprising resistance means 598 and the emitter 600 and collector 602 of a PNP transistor 604, is connected as at 606 and 608 to conductors 542 and 544; (g) a conductor means 610, comprising resistance means 482 and series situated collector 484 and emitter 612 of an NPN transistor 614, is connected as at 616 and 618 to conductors 542 and 544; (h) a conductor means 620, comprising series resistance means 622 and 624 and the collector 626 and emitter 628 of an NPN transistor 630, is connected as at 632 and 634 to conductors 542 and 544; (i) a conductor means 636, comprising the emitters 638, 640 and collectors 642, 644 of PNP transistor 646 and NPN transistor 494, is connected as at 650 and 652 to conductors 542 and 544; (J) a conductor means 654, comprising the emitters 656, 658 and collectors 660 and 662 of PNP transistor 664 and NPN transistor 668, is connected as at 670 and 672 to conductors 542 and 544; and (k) a conductor means 674, comprising series resistance means 676 and 678 along with the collector 680 and emitter 682 of an NPN transistor 684, is electrically connected as at 686 and 688 to conductors 542 and 544.

Still with reference to FIG. 11-B, a capacitor means 690 is electrically connected to both conductor means 560 and 518 in a manner whereby one electrical side thereof is connected to conductor means 560 as at a point electrically between resistance means 564 and switch means 562, while the other electrical side thereof is connected to conductor means 518 as at a point electrically between resistance 570 and input terminals 338, 340 of gates 302, 304 (FIG. 11-A).

A second capacitor 692 has one electrical side connected as to the base terminal 694 of transistor 590, and to conductor 506 as at a point electrically between resistances 574 and 576. The other electrical side of capacitor 692 is electrically connected as to point 634 of conductor means 544.

A resistance means 696 electrically interconnects conductor means 542 and base terminal 698 of transistor 604 while a capacitor 700 has one electrical side connected to base 698 and its other electrical side connected to conductor means 580 as at a point electrically between resistance 582 and collector 586.

A capacitor 702 is connected to conductor means 580 and 544 as to be in parallel with resistance 584.

One end of a resistance means 704 is connected to conductor means 544, as at a point electrically between resistors 550 and 552, and to the base terminal 706 of transistor 614.

Base terminals 708 and 710 of transistors 630 and 668 are respectively connected to resistors 712 and 714 which, in turn, are connected to conductor means 520 leading to, generally, gates 314 and 316 (FIG. 11-A).

Base terminals 716 and 718 of transistors 494 and 684 are respectively connected to resistors 720 and 722 which, in turn, are connected to conductor means 496 leading to, generally, gates 312 and 316 (FIG. 11-A).

A resistor 724 is placed generally electrically in parallel with the collector 662 and emitter 658 of transistor 668.

The base terminal 726 of transistor 646 is electrically connected to conductor means 620 as at a point 728 electrically between resistances 622 and 624 and, similarly, the base terminal 730 of transistor 664 is electrically connected to conductor means 674 as at a point 732 electrically between resistances 676 and 678.

The horizontally-positioning motor 94 is shown having its commutator contacts, or brushes, 734 and 736 electrically connected to conductor means 636 and 654, respectively, as at points 738 and 740 with point 738 being generally between and electrically connected to collectors 642 and 644 of transistors 646 and 494, and with point 740 being generally between and electrically connected to collectors 660 and 662 of transistors 664 and 668. Conductor means 492 and 490 may be considered as being respectively electrically connected to points 738 and 740.

Still referring to FIGS. 11-A and 11-B, diode 546, provided for reverse voltage protection, has its anode electrically connected to the battery 540 resulting in circuit means 300 being continuously energized. Resistance 548 is a low value resistance which, normally, experiences an insignificant voltage drop. Diode 554 is a zener diode which has a zener voltage in excess of the normal battery terminal voltage of battery 540. If a high positive transient voltage should appear at the terminal of battery 540, diode 544 will become conductive and the excess voltage of such transient then appear as across resistance 548. Therefore, diodes 546 and 554 and resistance 548 are provided as means for protecting the circuitry 300 during times of abnormal applied voltage conditions.

Switch 562, resistors 564 and 570, and capacitor 690 comprise a circuit which will generate a short-duration electrical pulse when normally open switch 562 is momentarily closed. Such pulse, which has a delay period equal to the "RC" value of resistance 570 and capacitance 690, is fed to the logic portion ( of the circuitry 3009) of FIG. 11-A. Resistance 564 is used to discharge capacitor 690 when switch 562 is again opened; in the preferred embodiment resistance 564 is of a magnitude in the order of a hundred times that of resistance 570.

Transistors 590 and 604, along with the associated components, comprise the ripple current detector means. Transistor 590 serves as firs stage a.c. amplifier which amplifies the voltage as appear as across resistance means 550 and 552. The motor current, of motor 94, flows through resistors 550 and 552 and, therefore, a.c.-wise, the ripple voltage appear as across the base-emitter terminals (694–588) of transistor 590 such being coupled by capacitor means 692. Transistor 604 serves as a second stage amplifier which is biased to be turned "off". The input to transistor 604 is coupled to the collector 586 of transistor 590 by capacitor 700. As the voltage at collector 586 of transistor 590 increase the decreases about its bias pint of approximately 5.0 volts, the negative excursions thereof are of the correct polarity to cause transistor 604 to turn "on" thereby producing positive voltage pulses across resistor 598. The pulses thusly created across resistance 598 are directed, through resistance 526, to the clock input terminal 514 of the counter means 508. Resistor 526 and capacitance 534 serve to filter the output of transistor 604 in order to eliminate high frequency electrical noise and pass only the basic frequency of the sensed ripple voltage.

Transistors 646, 494, 664 and 668, along with their related components, comprise an electronic "H" switch which can be used to drive the motor 94 in either direction. Transistors 494 and 668 are each high gain Darlington transistors while transistors 646 and 664 are each PNP transistors which are, in turn, controlled by NPN transistors 630 and 684. In the preferred embodiment, approximately the same current gain is achieved in turning "on" transistor 646 through transistor 630 as is produced by the Darlington transistor 494.

Gate means 312 and 314 effectively control the functioning of the "H" switch; for example, if the outputs at 406 and 408, of gates 312 and 314, are both logically LOW, then all of transistors 646, 494, 664 and 668 are non-conductive or "off". If the output at 406 is logically HIGH and the output at 408 is logically LOW, transistors 646 and 668 will be "off" while transistors 494, 684 and 664 will be "on"resulting in a current flow through motor 94 in a direction as from point 740 to point 738. Further, if the output at 406 is logically LOW and the output at 408 is logically HIGH, transistors 664 and 494 will be "off" while transistors 668, 630 and 646 will be "on" resulting in a current flow through motor 94 in a (reverse) direction as from point 738 to point 740. Accordingly, it should now be apparent that the levels of the voltage outputs (at 406 and 4080) of gates 312 and 314 will determine whether the motor 94 is placed in an energized ("on") state or in a de-energized ("off") state as well as the direction of rotation of the motor 94, if in an energized state.

The logic portion of the circuitry, comprised of gate means 302, 304, 306, 308, 310, 312, 314, 316, 318, 320, 322, 324, 326, 328, 330, 332, 480 and 502, controls whether the motor 94 should be "on" or "off" and the particular direction that the rotation of the motor 94 should be made to rotate, and, whether the conditions are such as to have the indicator light 166 energized ("on") or de-energized ("off"). The logic circuitry is shown as having a single bit of memory comprised of NOR gates 326 and 328 electrically interconnected as a simple set/reset flip-flop. One of the functions of the logical is to place the flip-flop in a state such that the output of gate 326 is logically LOW whenever switch means 118 of FIGS. 10 and 11-A is used.

The normal or usual sequence of events in using the circuitry of the invention is that the vehicular driver first adjusts the mirror 100 so that (as previously described) just the side of the vehicle is visible in the mirror 100. Then, upon pushing switch 562 closed, the logic of the circuitry causes the motor 94 to be turned "on" which, in turn, causes the motor 94 to drive the mirror 100 to the proper position whereat the normally blind viewing zone is viewed in the mirror 100. Further, when the mirror 100 becomes positioned, to view the blind zone, the output at 420 of gate 326 becomes logically HIGH which causes transistor 750 to become conductive and indicator lamp means 166 to be energized.

Transistor 750 is an NPN transistor having its base 752 electrically connected, through resistance means 754, to conductor means 460 and having its emitter 756 and collector 758 in circuit as with a light emitting diode (LED) 166. The indicator lamp means 166 is preferably electrically connected as through manually adjustable control means 760, carried for example as by the vehicular dash or instrument panel, in turn connected as to a source 762 of voltage which may be through the vehicular ignition switch means as at 132 of FIG. 10. The control means 760, of course, would be used to selectively adjust the brightness of indicator lamp means 166.

Let it now be assumed that mirror 100 has been manually adjusted, through control means 118, to a position, as previously described, wherein just a portion of the side of the vehicle is viewed in the mirror, and, that the output at 420 of gate 326 is LOW.

If now the output of gate 326 is LOW, the cross-coupled outputs of the flip-flop requires that the output at 422 of gate 328 be HIGH. With the output of gate 328 being HIGH, the input at terminal 336 of AND gate 302 also becomes HIGH. If at this time switch 562 is momentarily closed thereby producing a pulse across resistance 570, and applied to input terminals 338 and 340, the output at 396 of gate 302 will become HIGH for the duration of such pulse which, for example, may be in the order of 50.0 microseconds. When the output of gate 302 becomes HIGH, the output at 400 of OR gate 306 becomes HIGH which, in turn, causes the output at 406 of gate 312 to be HIGH assuming, of course, that at such time the output at 402 of gate 308 is also HIGH. The output of gate 312 is coupled, via 442, to the input 344 of gate 306. Therefore, when the output of gate 312 becomes HIGH such, transmitted via 442 to input 344 latches gates 306 and 312 both HIGH with the result that the output of gate 312 stays HIGH after the output pulse from gate means 302 has ceased. With the output at 422 of gate 328 initially HIGH, the output of gate 326 is LOW, which means that the pulse, brought about by the momentary closing of switch 562, cannot effect the outputs of gates 304, 310 and 314 thereby having the output at 408 of gate 314 be LOW. With the output of gate 312 being HIGH and the output of gate 314 being LOW, the motor 94 becomes energized, turned "on", with the result that the motor 94 turns in the direction which causes mirror 100 to be positioned, horizontally, to view the blind zone as depicted generally in FIG. 10 and 5.

One of the conditions required in order to cause the outputs of either gates 312 or 314 to be HIGH is that the output of AND gate 308 be HIGH. Input terminal 350, which is normally HIGH, of gate 308 is electrically connected, via 476, to transistor 614.

A portion of the control assembly 118 of FIG. 10 is schematically depicted in FIG. 11-B. Such portion is illustrated as comprising fixed electrical contacts 800, 802, 804 and 806 with contacts 800 and 806 being electrically connected to each other and to electrical ground. Fixed contacts 802 and 804 are electrically connected as to terminal means 808 which is preferably connected to a source of electrical potential as, for example, terminal means 536 of FIG. 11-B Movable electrical contacts 810 and 812 are operatively connected to each other as by means 814 as to move in a ganged fashion. The ganged connection 814 is, in turn, as is generally well known in the art, operatively connected to the control lever or joystick 152 (FIG. 10). Electrical contact 810 is connected, via conductor means 816, to conductor 492 while electrical contact 812 is connected, via conductor means 818, to conductor 490.

When the control lever 152 is actuated causing the ganged switch contacts 810 and 812 to move generally to the left, as viewed in FIG. 11-A, input terminal means 394 and motor contact 734 are brought to ground potential via closed contacts 800 and 810. At the same time contacts 804 and 812 are closed thereby bringing battery voltage and current flow to motor contact 736 with the result that motor current flow is in the direction from contact 736 to contact 734 causing the motor 94 to rotate in a first direction and move mirror 100 in a first horizontal (about a vertical axis) direction (as previously described).

When the control lever 152 is actuated causing the ganged switch contacts 810 and 812 to move generally to the right, as viewed in FIG. 11-A, input terminal means 392 and motor contact 736 are brought to ground potential via closed contacts 806 and 812. At the same time contacts 802 and 810 are closed thereby bringing battery voltage and current flow to motor contact 734 with the result that motor current flow is in the direction from contact 734 to contact 736 causing the motor 94 to rotate in a second direction (opposite to said first direction) and move mirror 100 in a second horizontal (about a vertical axis) direction (as previously described).

As is generally well known, in a control assembly as 118, the control or actuating lever 152 is force-biased, as by resilient means, so that when released (by the operator), the lever 152 and the various contacts positioned thereby return to their neutral or null positions, as generally depicted by contacts 810 and 812 in FIG. 11-A, wherein the circuits which can be established by contacts 810 and 812 are open. For purposes of description, let it be assumed that when control means 152 is moved in the direction of arrow portion 160, the motor 94 is rotated in a direction whereby mirror 100 presents a field of view, to the driver, progressively further horizontally away from the vehicle, if control means 152 is moved in the direction of arrow portion 156, the motor 94 is rotated in an opposite direction whereby mirror 100 presents a field of view, to the driver, progressively horizontally closer to the vehicle.

As previously stated, transistors 646, 494, 664 and 668 comprise a solid state H-switch means which can, selectively, cause rotation of motor 94 in either direction (with attendant related movement of mirror 100). Connecting motor 94 to supply voltage (battery 540) and electrical ground, by use of the switch contacts 810 and 812 as hereinbefore described, presents no problem to the circuitry because the electronic H-switch, comprised of transistors 646, 494, 664 and 668, is turned "off" and unaffected by the manual switch means 118 (810, 812) when it is employed. However, in the event the H-switch means should be "on", use of the manual switch means (810, 812) will electrically short an H-switch transistor and, in the preferred embodiment, will result in the current through resistance means 550 increasing to a value sufficient to cause transistor 614 to turn "on". When transistor 614 thusly becomes conductive, its collector voltage decreases to a low value, approaching electrical ground, and such becomes a LOW input signal, applied via conductor means 476 to input terminal 350 of gate 308, causing the H-switch means to be turned "off"

Input terminal 350 (of gate 308), which is normally at HIGH, is connected, as via 476, to the collector 484 of transistor 614 which may be considered to be a short circuit detector. If an electrical short should occur, that is, actuating the switch contacts 810 and 812 to closed conditions while the H-switch means is "on", the input signal at terminal 350 becomes LOW and causes the H-switch means to be immediately turned "off". The other input terminal 348 of gate 308 is connected, via 474, to the output 478 of inverter 480. The signal at output 478 and at input 348 is HIGH until such instant as when the counter means 508 indicates that the motor 94 has rotated the mirror 100 to its proper position wherein the driver is presented a view into what would be the blind zone as generally depicted in FIG. 5.

When gates 312 and 306 become latched, as previously described, the input at terminal 364 of NOR gate 316 becomes HIGH which, in turn, causes the output at terminal 410 to become LOW. When the output at terminal 410 of gate 316 becomes LOW the input at reset terminal 510 of counter means 508 also becomes LOW thereby enabling the counter means 508 to count. That is, whenever the input at reset terminal 510 is HIGH, the counter means 508 is set to zero; however, when the input again becomes LOW at 510, the counter means 508 is able to count. Also, when the output at 410 of gate 316 is LOW inverter 502, which via 498 receives such output as an input at 500, produces a HIGH output at terminal 504 which, in turn, via 506, supplies current through resistance means 582 and 576 (FIG. 11-B) causing transistor 590 to amplify the ripple pulses produced as previously discussed. Inverter means 502 is also employed to minimize the current drawn by the circuit when in its quiescent state. In the embodiment disclosed, if inverter 502 were not employed, a one-milliampere current would be continually drawn. The remainder of the circuitry, when quiescent, draws only microamperes because CMOS gates are preferably employed.

With the input to terminal 510 of counter 508 being LOW and transistor 604 producing pulses related to rotation of motor 94, the counter means 508 counts the number of such pulses Because of such factors as the construction of motor 94 and the gear ratio of the mirror drive mechanism 112, 110 and 98, the number of pulses, corresponding to the required movement of the mirror in order to have the mirror 100 present a view of the blind zone (as depicted in FIG. 5), may be in the order of 1,000. AND gate 330 monitors the output of counter means 508 and when the preselected proper number of pulses have been counted and accumulated, the output at terminal 426 of gate 330 becomes HIGH. A conductor means 331 is depicted as operatively interconnecting output means 333 of counter means 508 to input means 334 of gate 330. As is known, a number of conductor means may interconnect counter means 508 and gate 330 with the number of such being dependent upon the actual count (number of pulses) which would indicate that the mirror 100 has been rotated the desired angular rotation. Therefore, depicted conductor means 331 is intended to represent any required number of such conductor means leading from related outputs of the counter means 508 and to related input means of the gate means 330.

When the output at terminal 426 becomes HIGH (that being the indication that the required number of motor 94 pulses have been counted and that the mirror 100 has been rotated the required angular distance by the motor 94) the input at terminal 488 of inverter 480 also becomes HIGH with the result that the output at terminal 478 becomes LOW and such is applied, via 474, to input terminal 348 of AND gate 308. Consequently, when the output of inverter 480 becomes LOW, the output of AND gate 308 becomes LOW which immediately causes the output of gate 312 to become LOW and such, in turn, stops the previous energization of the motor 94 and terminates the latch condition as between gates 306 and 312. Further, when the output at 426 of gate 330 becomes HIGH, the inputs at terminals 378 and 380 of gates 322 and 324 also become HIGH via 470.

Since the output of gate 306 was HIGH when the motor 94 was energized ("on"), and since output 400 of gate 306 is connected, via 464, to input terminal 376 of gate 322, the turning "on" of gate 330 (i.e. having the output at 426 of gate 330 become HIGH) causes gate 322 to be turned "on" (i.e. having the output at 416 of gate 322 become HIGH. When gate 322 becomes "on" such sets the flip-flop to a state wherein gate 326 is turned "on" (i.e. having the output at 420 of gate 326 become HIGH) which, in turn, causes energization (turning "on") of the indicator lamp means 166 and causes input terminal 342 of gate 304 to become HIGH via 460. When lamp means 166 becomes energized, this serves as a sensory indicator to the vehicular operator that the mirror 100 has been moved to and is in the blind zone viewing position. It should be noted that gate 322 is turned "on" before gate 308 is turned "off" (i.e. the output at terminal 402 of gate 308 becomes LOW) because the gate delays of gates 480, 308, 312 and 306 occur before the associated input of 322 becomes LOW. Also, when the output at terminal 406 of gate 312 becomes LOW, the output at terminal 410 of gate 316 becomes HIGH thereby putting the counter means 508 back into reset and turning "off" transistor 590.

With the mirror 100 situated in the blind zone viewing position, and the indicator 166 being "on", the momentary manual closing of switch means 562 again causes a positive pulse on inputs 338 and 340 of gates 302 and 304. This time gate 304 responds to the applied pulse by having its output, at 398, become HIGH because its other input at 342 is HIGH as a result of the output at 420 of gate 326 being HIGH. In a manner similar as to when the output of gate 328 was HIGH, the outputs at 404 and 408 of gates 310 and 314 become HIGH and gates 310 and 314 become latched to each other. The output at 410 of gate 316 then becomes LOW and the counter means 508 again starts counting the motor 94 ripples. With the output at 408 of gate 314 being HIGH and the output at 406 of gate 312 being LOW, the motor 94 now rotates (drives) in such a direction as to cause the mirror 100 to, in effect, return from its blind zone reviewing position and again view the starting position, that being a view of a portion of the side of the vehicle as previously described. The energization of motor 94 stops when the counter means 508 again reaches the same count as it had when it caused the mirror 100 to be rotated into the blind zone viewing position.

As already stated, when the output of gate 330 becomes HIGH, the inputs at terminals 378 and 380 of gates 322 and 324 become HIGH. Now, however, the output of gate 324 becomes HIGH because its input, at terminal 382 connected to output 404 of gate 310, is HIGH. The output 418 of gate 324 is connected via 468 to input terminal 374 of OR gate 320 the output of which is applied via 452 as a reset signal to terminal 384 of gate 326 thereby making the output at 420 of gate 326 become LOW and the output at 422 of gate 328 become HIGH. This, in turn, causes the transistor 604 and the indicator means 166 to be de-energized.

OR gate 332, AND gate 318 and OR gate 320 perform the function of turning "off" the indicator lamp means 166 if the mirror 100, while in its blind zone viewing position, is horizontally moved through the use of the manually operated switch or control means 118, 814, 810, and 812. If the logic circuitry is, in effect, calling for the motor 94 to be "off", the outputs of both gates 312 and 314 are, at that time, LOW while the output of gate 316 will be HIGH as will the input terminal 368, of gate 318, connected via 448 to the output 410 of gate 316. A purpose of gate 332 is to monitor the voltage across the motor 94 and produce a HIGH output at 424 if the motor 94 is, in fact, running (energized). With both inputs of gate 318 being HIGH, the output at 412 of gate 318 will also be HIGH. This, in turn, causes the output at 414 of gate 320 to become HIGH which, via 452, is a reset signal to input 384 of gate 326 thereby making the output of gate 326 LOW and causing both transistor 750 and indicator lamp means 166 to be turned "off". Of course, if the output of gate 326 already were LOW, it would remain LOW.

To further explain why gate 332 produces a HIGH output only when the motor 94 is "on", it should be noted that if one terminal of the motor 94 (for example 734) is at ground potential and the other terminal (for example 736) is at battery 540 voltage, the motor is running. That is, always one terminal or the other terminal of the motor 94 will be HIGH when the motor 94 is running. Therefore, an OR gate may be used to show whether the motor 94 is running. However, when the motor 94 is "off" the terminals 734, 736 of the motor 94 would, voltage-wise, be floating and the output of gate 332 would be indeterminate. This is remedied by grounding one electrical side of the motor 94 with a value of resistance which is high compared to the motor 94 resistance. Such a resistance is depicted at 724 of FIG. 11-B. With the manual switches being in their normal open positions and the electronic H-switch "off", both electrical sides of the motor 94 are at ground potential. If side 736 of the motor 94, connected to resistance 724, is taken to battery voltage, the current through resistance 724 is insignificant with such being in the order of a milliampere. Therefore, it can be seen that if the output of gate 332 is HIGH, motor 94 is in fact running.

There are two timing considerations with regard to causing the output of gate 332 to become HIGH ("on") and LOW ("off"). First, when the motor 94 is running and is then turned "off", because of inertia the motor 94 does not immediately stop rotating. That is, it may require a couple-of-tenths of a second, for the motor 94 to actually stop, after termination of energization thereof. During the coast-down period (that being the span of time from termination of energization of motor 94 to actual stopping of rotation of motor 94) the motor 94 acts as a generator supplying voltage to gate 332 thereby holding gate 332 "on" (i.e. the output at 424 being HIGH) The output at 410 of gate 316 immediately becomes HIGH when the motor 94 is, electronically, turned "off". In order to prevent the output of gate 318 becoming, improperly, HIGH, the application of the output from gate 316 to input 368 of gate 320 must be delayed for such time as when the motor 94 actually stops. The attendant required time delay is provided by resistance 522 and capacitor 530. In this arrangement, capacitor means 530 must be charged through resistance 522 before the input at 368 of gate 318 can become HIGH. It has been found that an R-C time constant, for 522 and 530, in the order of 1.0 second provides satisfactory results.

The second problem arises when the motor 94 is, electronically, turned "on". When the outputs of either gates 312 or 314 become HIGH, the output of gate 316 becomes LOW. However, the presence of the R-C network, comprised of resistance 522 and capacitor 530, delays the actual reduction of the magnitude of the voltage at input terminal 368 of gate 318. This is at least partially remedied by employing diode 528, across resistance 522, as to bypass the discharge of capacitor 530. By thusly employing diode 528, the time required to charge capacitor 530 becomes relatively long while the discharge time is relatively short, the discharge time of capacitor 530 is still too long to prevent both inputs at 368 and 370 of gate 318 from becoming HIGH and, improperly, resetting the flip-flop. To overcome this, the application, to terminal 370 of gate 318, of the HIGH output at 424 of gate 332, resulting from the turning "on" of motor 94, is caused to be delayed by the R-C network of resistance 524 and capacitor 532. It has been found that an R-C time constant (resistance 524 and capacitor 532) of about 10.0 milliseconds provides a satisfactory result.

The circuit means 300 of FIGS. 11-A and 11-B discloses one embodiment; in view of the teachings made herein, it will become apparent to those of ordinary skill in the art that variations thereof are possible and that various solid state devices may be employed in practicing the invention.

In the embodiment of FIGS. 11-A and 11-B, the various components may have values and/or be identified as to their types and sources as follows:

| | |
|---|---|
| Resistor 522: | 240K |
| Resistor 524: | 120K |
| Resistor 548: | 1.0 ohm |
| Resistor 526: | 120K |
| Resistor 564: | 200K |
| Resistor 570: | 5K |
| Resistor 574: | 82K |
| Resistor 576: | 11K |
| Resistor 582: | 5K |
| Resistor 584: | 500 ohms |
| Resistor 696: | 20K |
| Resistor 598: | 20K |
| Resistor 482: | 10K |
| Resistor 550: | 1.0 ohm |
| Resistor 704: | 1.0K |
| Resistor 622: | 1.0K |
| Resistor 624: | 1.0K |
| Resistor 712: | 10K |
| Resistor 552: | 1.0 ohm |
| Resistor 720: | 10K |
| Resistor 724: | 10K |
| Resistor 714: | 10K |
| Resistor 676: | 1.0K |
| Resistor 678: | 1.0K |
| Resistor 722: | 10K |
| Resistor 754: | 120K |

The various logic gates employed may all be integrated circuit quad-chip 4000B series CMOS. AND gates 302, 304, 308, 312, 314, 318, 322, 324 and 330 may be type 4081B, OR gates 306, 310, 320 and 332 may be type 4071B and NOR gates 316, 326 and may be type 4001B. Counter means 508 may be an integrated circuit 12-bit counter type 4040B. Transistors 590, 614, 630 and 684 may be a type 2N3904 NPN transistor. Transistor 604 may be a type 2N3906 PNP transistor. Transistors 646 and 664 may be a type MP5A56 PNP transistor. Transistors 750, 494 and may be a type MPSA27 NPN transistor. Diodes 528 and 546 may be type 1N4004; diode 166 may be a green 10 m.a. L.E.D.; while zener diode 554 may be type 1N4749. Further, capacitors 530 and 702 are each 5.0 μf; capacitors 532, 692 and 700 are each 0.1 μf; capacitor 690 is 0.01 μf; and capacitor 534 is 0.001 μf. All of the above components may be obtained from various sources with one such source being MOTOROLA, INC., having an address of: 3102 North 56th Street, Phoenix, Arizona, U.S.A.

As hereinbefore indicated, not all remotely positioned mirror assemblies are electrically operated in that some are remotely positioned by manual operation of associated motion transmitting means. Some of such remotely positionable manually operated mirror assemblies employ a joystick control connected to three motion transmitting cable assemblies which, in turn, are operatively connected to a variably positionable mirror. One such prior art structure is disclosed in U.S. Pat. No. 3,407,684 of which the disclosure, to the extent that it may be necessary to understand the overall operation thereof, is hereby incorporated by reference. Still other prior art remotely positionable manually operated mirror assemblies employ a joystick control connected to only two motion transmitting cable assemblies while the third cable assembly is dispensed with by the substitution of spring means continually urging the mirror in a direction resisted by the remaining two cable assemblies. By way of general example, the structure of said U.S. Pat. No. 3,407,684 could be converted to such a two-cable type of remote adjustment by eliminating the cable assembly 26, 26' thereof and substituting spring means as above the pivot 44 and between cables 22 and 24 thereof to operatively engage and urge the mirror 18 and carrier in a counter-clockwise direction as viewed in FIG. 6 of said U.S. Pat. No. 3,407,684.

Figure 12:
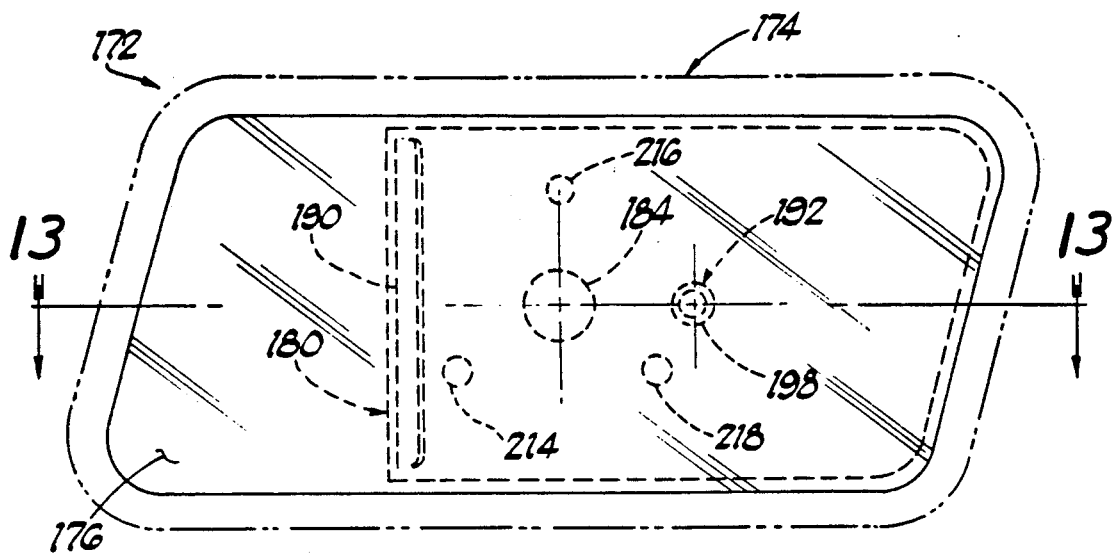
FIG. 12 is a view of still another mirror embodying teachings of the invention.
Figure 13:
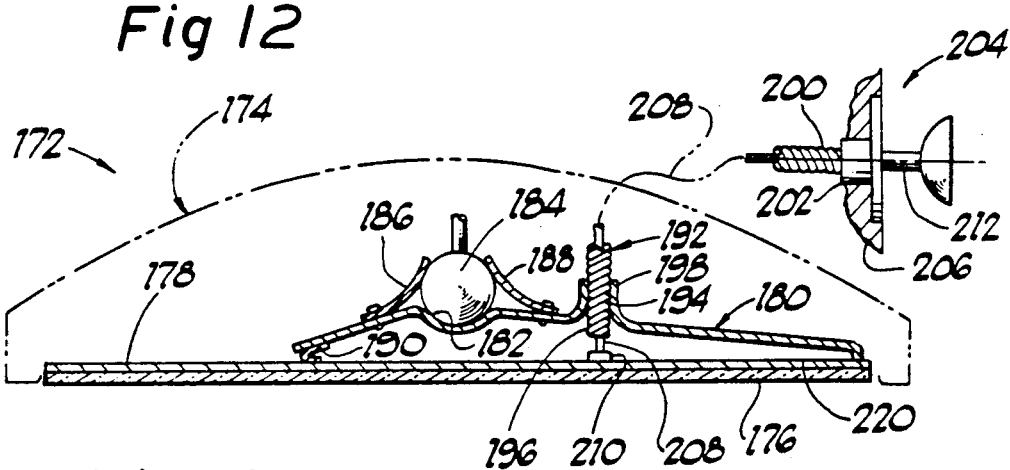
FIG. 13 is a cross-sectional view, taken generally on the plane of line 13—13 of FIG. 12 and looking in the direction of the arrows.
Figure 14:
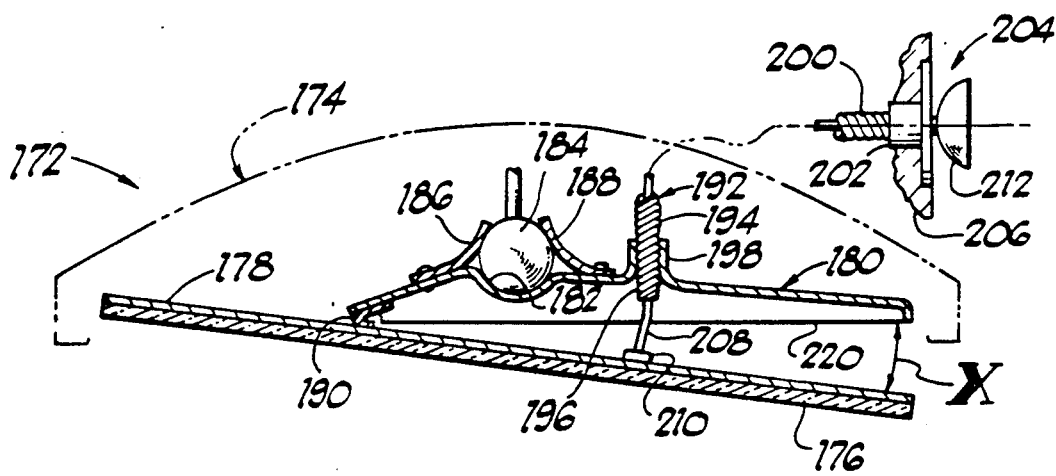
FIG. 14 is a view similar to that of FIG. 13 but illustrating the structure of FIG. 13 in a particular mode of operation.

FIGS. 12, 13 and 14 illustrate a manually remotely positionable mirror assembly employing teachings of the invention. For purposes of clarity, certain of the elements and/or details in FIGS. 12, 13 and 14 are shown in simplified form especially since such elements, per se, may be of any suitable form and will be clearly understood by those of ordinary skill in the art.

Referring in greater detail, FIGS. 12 and 13 illustrate a mirror assembly 172 which may be comprised of a housing or support means 174 and a mirror 176 which may be provided with suitable backing or support means 178. A body-like carrier 180, provided as with a spherical indentation 182, is operatively pivotally connected to a ball-like pivot 184 as by suitable spring-like retainer means 186 and 188. The pivot member 184 is rigidly carried as by the housing or support means 174 in any suitable manner and FIGS. 3 and 5 of said U.S. Pat. No. 3,407,684 illustrate, by way of example, one such arrangement. The carrier means 180 is, in turn, operatively secured to mirror 176 as by suitable hinging or pivoting means 190. In the preferred embodiment, such hinging means 190 would be secured to the mirror backing or support means 178.

A bowden cable assembly 192 has one functional end 194 of its sheath 196 suitably fixedly secured as to a formed tubular portion 198 of carrier 180 and has its other functional end 200 fixedly secured as to a control housing 202 of associated control means 204 carried as by the driver's door (a portion of which is shown at 206) of the vehicle. One end of the movable wire 208 of the cable assembly 192 is operatively secured to the mirror 176 as by suitable securing means 210 securing such wire 208 to the backing or support means 178. The other end of wire 208 is suitably connected as to an axially movable control member 212 carried by and forming a part of the control means 204.

As already indicated, the embodiment of the invention disclosed in FIGS. 12, 13 and 14 is directed to a mirror assembly of the manually remote adjustable type. However, for clarity, the various cable assemblies and joystick control therefor as are usually employed in such assemblies are not shown. In this regard, it is believed sufficient to note that if a three cable assembly control were to be employed, in combination with a joystick or the like, the ends of the moving wires of the respective cable assemblies could be operatively secured to the carrier 180 as at respective locations depicted at 214, 216 and 218 of FIG. 12. Such would be, in effect, functionally equivalent to the control wires 22, 26 and 24 of FIGS. 4, 5 and 6 of said U.S. Pat. No. 3,407,684 along with the joystick control 92 thereof. If the embodiment of Figures 12, 13 and 14 were to be manually remotely controlled as by two cable assemblies, then, as previously discussed, 216 could be the point at which a spring is operatively connected to the carrier 180 while control wires could be operatively connected to the carrier as at 214 and 216.

In any event, it should now be apparent that the carrier means 180 and mirror 176 are, as a unit, remotely manually selectively adjustable as about support pivot 184 by the driver. With regard to FIG. 13, it can be seen that with the control member 212 withdrawn, wire 208 pulls mirror 176 and backing means 178 into abutting engagement with body or carrier 180 as by contacting end surface means 220 thereof. This abutting relationship will be maintained even through the carrier 180 and mirror 176 are adjustably pivotally moved about support pivot 184 because no relative longitudinal motion occurs as between the shroud or sheath 196 and its interior wire 208.

Referring primarily to FIGS. 12 and 13, let it be assumed that the driver has already adjusted the carrier 180 and mirror 176 as to provide the desired elevation of the scene to be viewed by the driver in the mirror 176 and then has further adjusted the carrier 180 and mirror 176, in the horizontal, as to thereby see, within mirror 176, just a slight portion of the driver's vehicle, as depicted generally at 58 of FIG. 4. Also let it be assumed that when such slight portion 58 of the driver's vehicle is seen in mirror 176, mirror 176 and carrier means 180 have attained a position as depicted in FIG. 13 and further adjustment of the carrier means 180 ceases At this condition, the view presented by the outside mirror assembly 172 would be that as generally depicted in FIG. 4 defining a relatively large blind zone 62.

However, with the invention, the driver merely pushes the control member 212 to a second of its two operating positions, as depicted in FIG. 14, thereby causing wire 208 to longitudinally extend from shroud 196 and in so doing cause mirror 176 to be rotated o pivoted on hinging means 190 and assume a relative position as depicted in FIG. 14. The length of movement of control member 212 (and the wire 208 connected to it) from its position shown in FIG. 13 to its position shown in FIG. 14 is such as to result in said angle X being traversed by mirror 176. Said angle X, of course, is that angle which horizontally shifts the scene viewed by the driver to be in accordance with that depicted in FIG. 5 wherein the dangers of the (FIG. 4) blind zone 62 are eliminated.

Figure 15:
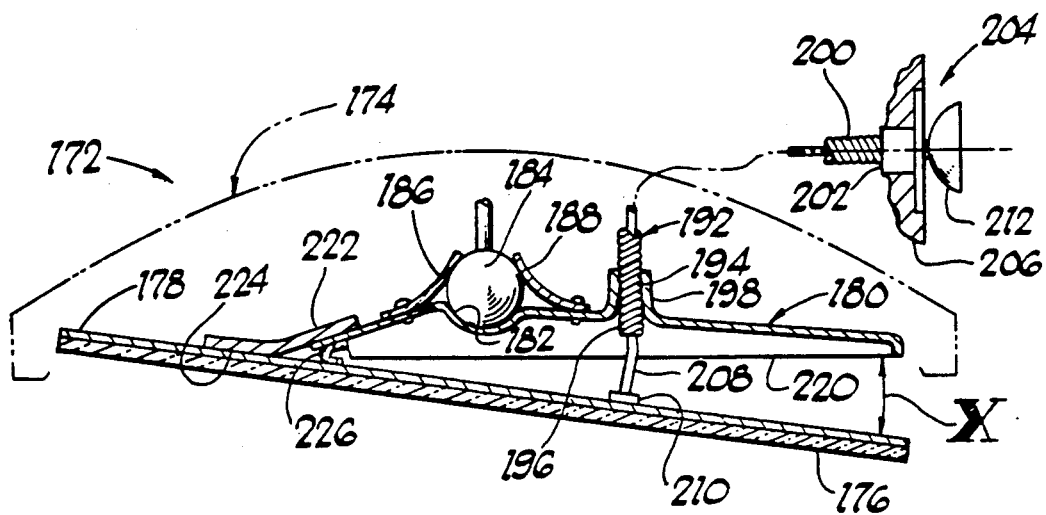
FIG. 15 is a view similar to FIG. 14 and illustrating a modification of the embodiment of FIGS. 12, 13 and 14.

FIG. 15, a view similar to that of FIG. 14, illustrates a modification of the invention as disclosed in FIGS. 12, 13 and 14. In FIG. 15 all elements, except as otherwise noted, which are like or similar to those of Figures 12, 13 and 14 are identified by like reference numbers. In the main, the difference between the embodiments of FIGS. 15 and 14 is that in FIG. 14 the angle X was determined by the length of the stroke or movement of control member 212 and the wire 208 moved thereby while in the embodiment of FIG. 15, the angle X is determined as by a positive abutment or stop means 222 suitably secured as to carrier 180 and having an abutment or stop surface 224 for operatively engaging the mirror 176 as by contacting the backing member 178. The embodiment of FIG. 15 also contemplates the provision of spring means normally urging the mirror 176 to the depicted position against stop surface means 224 thereby employing the control member 212 and wire 208 solely for drawing or moving the mirror 176 back into abutting condition against carrier surface means 220 (such condition being depicted in FIG. 13). If such spring means were to be employed, suitable restraining means as, for example, detent means could be employed in combination with the control member 212 to thereby hold the mirror 176 in operative abutting engagement with surface means 220 of carrier 180, against the resilient force of such spring means, when moved to such operative abutting engagement by the driver In this regard it is contemplated that the hinging means 226 may in fact be a spring-like or resilient means normally urging the mirror 176 against stop surface 224. Of course, if desired, pure pivoting or hinging means could be employed and separate spring means, torsion or compression, provided for thusly urging the mirror against said stop 224.

Figure 16:
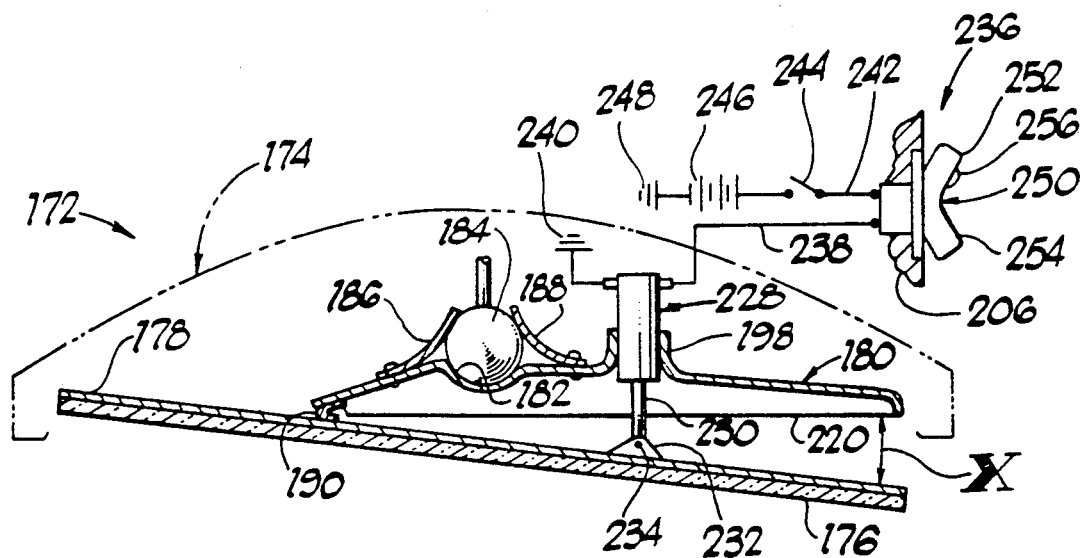
FIG. 16 is a view similar to both FIGS. 14 and 15 and illustrating another modification of the embodiment of FIGS. 12, 13 and 14.

FIG. 16, a view similar to either FIGS. 14 or 15, illustrates another modification of the invention as disclosed by FIGS. 12, 13 and 14. In FIG. 16, all elements, except as noted otherwise, which are like or similar to those of FIGS. 12, 13 and 14 are identified with like reference numbers.

In the embodiment of FIG. 16, instead of cable means 192 (as employed in the embodiments of FIGS. 12-15) a solenoid assembly 228, securely held as by portion 198, is employed to move the mirror 176 through said angle X to the depicted position. More particularly, the armature 230, operatively connected to the mirror 176 as by suitable bracket 232 and pivot means 234, would have a stroke the length of which would result in the achievement of said angle X. In this embodiment it is preferred that spring means normally urge the mirror 176 back to a closed or abutting position against surface means 220 of carrier means 180. Such spring means may, as is well known in the art, form a part of the solenoid assembly 228 and normally urge the armature means 230 upwardly (as viewed in FIG. 16) into the housing of the armature assembly 228 as to be in a fully contracted position at which time the mirror 176 would be operatively abutting carrier surface means 220. Of course, separate spring means could be provided for moving the mirror 176 operatively against surface means 220, For example, in the embodiment of FIG. 16 the hinging or pivoting means 190 may be of the type as shown at 226 of FIG. 15 and described with reference thereto so that the hinging means itself would provide the resilient force normally urging mirror 176 toward operative abutting engagement with surface means 220.

As described with reference to FIGS. 12, 13 and 14, once the carrier 180 and mirror 176 are adjusted by the driver to the initial position depicted in FIG. 13 (that being when the driver views the said small portion 58 of the driver's vehicle) what the driver, of the vehicle equipped with the embodiment of FIG. 16, does is to close an electrical circuit as to energize the solenoid or electrical motor means 228 as to thereby move mirror 176 through said angle X. More particularly, a butterfly or rocker type switch assembly is depicted at 236 and has conductor means 238 leading therefrom and to a terminal of the solenoid means 228. Another terminal of the solenoid 228 is shown as being brought to ground potential as at 240. A second conductor means 242, comprising serially situated switch means 244 preferably closed by and when the vehicle ignition switch is closed, serves to electrically interconnect a source of electrical potential 246 which is led to ground potential as at 248, with switch means 236.

The switch member 250, of switch assembly 236, is selectively engageable and actuated by the driver. As generally depicted, and as known in the art, the switch member 250 may be considered as having generally oppositely situated arm portions 252 and 254 which are engageable by the driver and alternately depressible. With the switch means 244 (which may in fact comprise a portion of the vehicular ignition switch assembly) closed, when the driver pushes switch arm 252 a circuit is completed through the switch means 236 and conductor 238 resulting in the energization of solenoid means 228 and consequent movement of mirror 176 through said angle X. Once the solenoid means 228 is thusly energized the switch means 236 maintains the circuit therethrough closed as to maintain energization of the solenoid motor means 228. Also, as generally indicated at 256, suitable indicator light or lamp means may be provided as to become energized, whenever solenoid means 228 is energized, thereby providing a visual indication of such condition to the driver.

If the driver should desire, for some reason, to again reposition the mirror 176, the driver can depress switch arm 254, so as to open the circuit through switch means 236, and thereby de-energize solenoid 228 returning the mirror 176 into operative abutting engagement with surface means 220 at which time the driver could again reposition the carrier 180 and mirror 176, as a unit, as by the associated manually actuatable cable assemblies. Of course, as illustrated, in the preferred embodiment, whenever the vehicular ignition switch is opened, the circuit through conductor means 242 is opened and solenoid means 228 becomes de-energized with mirror 176 returning to operative abutting engagement with surface means 220.

FIGS. 8 and 9 depict the auxiliary mirror surface 86b being formed, as by grinding, into the body of the main outside mirror 80b. If it should be desired to make the body of mirror 80b quite thin, such could result in the width thereof, $d_2$, becoming too small (the glass thickness and the relative angle of the main to auxiliary surfaces determining the maximum width of the auxiliary viewing surface that can be ground in) for quick and effective sighting. If this should become a problem, such can be overcome as by the embodiment of FIGS. 17 and 19.

Figure 17:
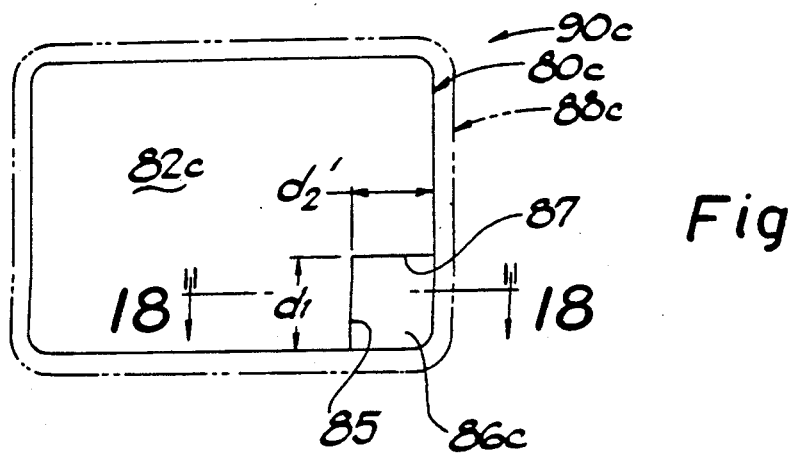
FIG. 17 is a view of another mirror embodying teachings of the invention.
Figure 18:
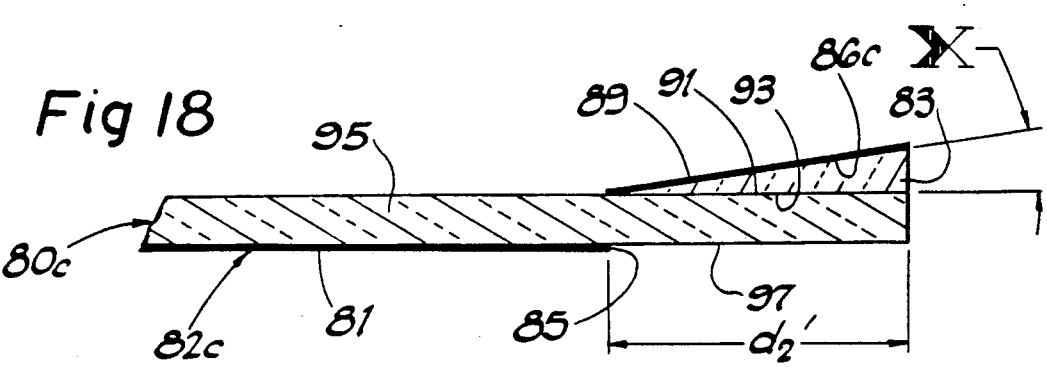
FIG. 18 is a cross-sectional view taken generally on the plane of line 18—18 of FIG. 17 and looking in the direction of the arrows.

FIG. 17 is a view similar to FIGS. 6 and 8 and depicts a further embodiment of the invention and FIG. 18 is an enlarged fragmentary cross-sectional view taken as on the plane of line 18—18 of FIG. 17. All of the elements in FIGS. 17 and 18 which are like or similar to those of Figures 6, 7, 8 and 9 are identified with like reference numbers provided with a suffix "c", with the exception of angle, X, and dimension d, which are not provided with any suffix.

Referring in greater detail to FIGS. 17 and 18, a main mirror body 95 has its forward surface 97 (that being the surface more closely disposed to the driver) coated as with a suitable reflective coating 81 thereby defining the main flat planar mirror surface 82c. The coating 81 is not applied to the entire glass body 95 and the limits thereof are generally depicted as by edges designated 85 and 87. A glass wedge 83 is attached to the rearward surface 91 of body 95. This may be done by applying a suitable adhesive to the juxtaposed portions of surface 91 and surface 93 of wedge 83. The adhesive would, of course, have an index of refraction close to that of the glass in order to avoid reflections from the adhesively bonded surfaces. The rearward surface of the wedge 83 would have a reflective coating 89 applied thereto thereby defining the auxiliary mirror surface 86c. As should be apparent, the dimension, $d_2'$, is a function of $d_2$ where $d_2$ is perpendicularly projected width of auxiliary mirror surface 86c. The wedge 83 would, of course, be positioned, against the rearward surface and located as to fill at least the area, as projected in FIG. 17, defined generally below edge 87 and to the right of edge 85.

Figure 19:
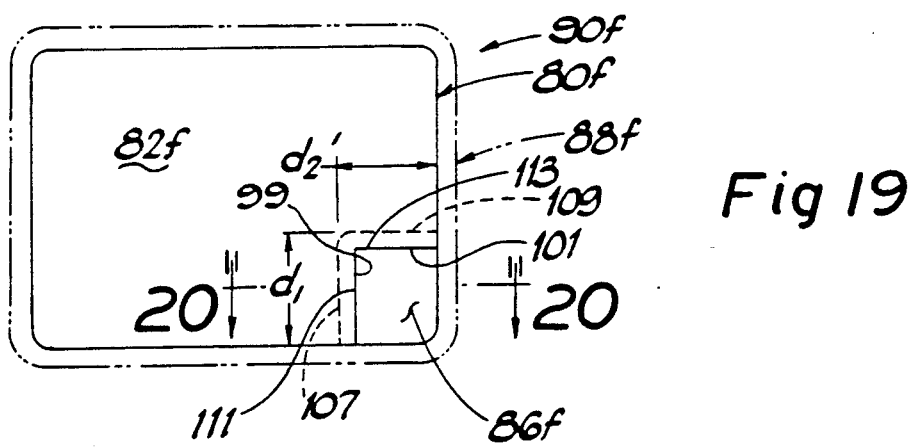
FIG. 19 is a view of still another mirror embodying teachings of the invention.
Figure 20:
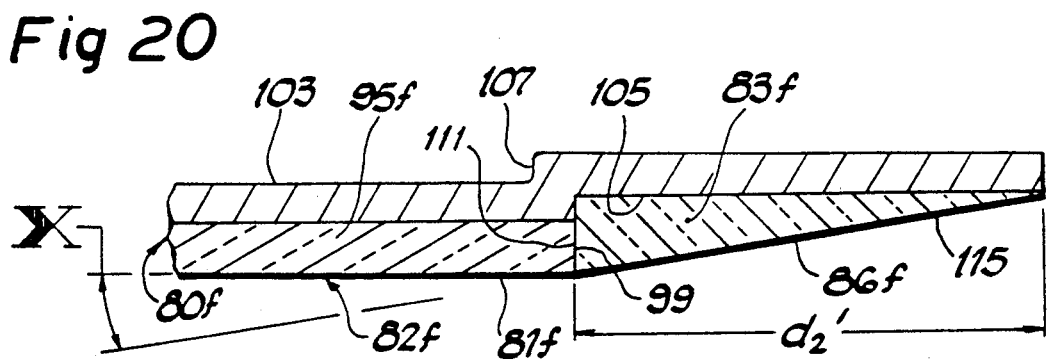
FIG. 20 is a cross-sectional view taken generally on the plane of line 20—20 of FIG. 19 and looking in the direction of the arrows.

FIGS. 19 and 20 illustrate another embodiment of the invention. FIG. 19 is a view similar to FIGS. 6, 8 and 17 and FIG. 20 is an enlarged fragmentary cross-sectional view taken as on the plane of line 20—20. All of the elements in FIGS. 19 and 20 which are like or similar to those of Figures 6, 7, 8, 9, 17 and 18 are identified with like reference numbers provided with a suffix "f", with the exception of angle X, and dimensions $d_1$ and $d_2$ which are not provided with any suffix.

Referring in greater detail to FIGS. 19 and 20, the main mirror body 95f has its forward surface coated as with a suitable reflective coating 81f thereby defining the main flat planar mirror surface 82f. The main body 95f is cut as to provide cut-out like edges 99 and 101. The embodiment of FIGS. 19 and 20 contemplates a support or backing member 103 which is suitably secured to, and be rearwardly of, mirror body 95f. The backing member 103 is provided with a stepped surface 105 against which a wedge-like glass body 83f is suitably secured. The stepped surface 105 may be within a generally rearwardly protruding portion of member 103 defined generally by transition surfaces or edges 107 and 109. When the wedge member 83f is secured to the backing member 103, the left (as viewed in FIGS. 19 and 20) edge 111 thereof is brought against edge 99 of main body 95f and the upper edge 113 thereof is brought against edge 101 of main body 95f. As should be noted, the thickness of the wedge body 83f at its edge 111 is significantly greater than the thickness of main body 95f. A reflective coating 115 is applied to the forward surface of the wedge body 83f thereby forming the flat planar referencing or auxiliary mirror surface 86f.

Each of the embodiments of FIGS. 17 and 18 and FIGS. 19 and 20 provides for the ability to have a relatively wide auxiliary mirror while maintaining an overall mirror surface free of protuberances.

It should be made clear that the mirrors 80c and 80f (respectively of FIGS. 17 and 18 and FIGS. 19 and 20) may be employed in any overall mirror assembly. That is, referring in particular to FIGS. 17 and 18, the mirror 80c may be mounted in or carried by any suitable housing and/or carrier means depicted in simplified form and in phantom line at 88c of both FIGS. 17 and 18. Such, in turn, may be considered an overall mirror assembly 90c. In this regard, the mirror assembly 90c may be of the type which is suitably pivotally mounted outside of the vehicle and requiring the driver to manually grasp the mirror assembly 90c in order to adjustably position it in a selected attitude. Also, the mirror assembly 90c may be of the type which is often referred to as being a remote manually adjustable mirror (one such structure is shown by said U.S. Pat. No. 3,407,684). That is, as is well known in the art, while the mirror assembly 90c would be mounted outside of the vehicle, the driver is provided with a joystick, or some other control, situated within the vehicle, which is operatively connected to the mirror as by bowden wires or cables so that when the joystick is operated by the driver, the motion thereof is transmitted to the mirror for the remote movement and positioning of such mirror. Still further, the mirror assembly 90c may be of the type which is often referred to as being a remote electrically (or power) adjustable mirror. With such, as is well known in the art, the mirror assembly 90c would be mounted outside of the vehicle while suitable related electrical control means (which may be of the joystick type) is situated within the vehicle. Electric motors are provided for causing the mirror, as 80c, to rotate or pivot about both vertical and horizontal axes to a selected attitude and activation of such electric motors is achieved and controlled by the driver through actuation of the electrical control means. It is believed that in at least the vast majority of such remote electrically adjustable mirror assemblies, the electrical motors and related drive trains are contained within the overall mirror housing which housing remains stationary while the mirror, such as 80c, rotates relative to the stationary housing. Accordingly, in practicing the invention, as with the embodiment of FIGS. 17 and 18, in a remote electrically adjustable overall mirror assembly configuration, the electrical drive motors could be fixedly situated as within housing or carrier means 88c and operatively connected to the mirror 80c as to, upon actuation of the electrical control means, rotate the mirror 80c to the selected position or positions.

The foregoing, stated with regard to the embodiment of FIGS. 17 and 18, applies equally well to the embodiment of FIGS. 19 and 20.

As should now be apparent, the invention as herein disclosed and described provides many benefits over that as practiced by the prior art. For example, the blind zone 62 of FIG. 4 is effectively eliminated and the dangers thereof are, for all practical purposes, totally eliminated which results in safer driving in traffic. Further, as practiced by the prior art and depicted in FIG. 4, one limit 26 of the viewing angle $V_O$ includes a substantial portion of the roadway lane 48 rearwardly of vehicle 10. Consequently, if a second vehicle were in the same lane 48 and following vehicle 10, the light from the headlights or headlamps (or at least one of such) of the second following vehicle would strike the mirror 14 and cause glare for the driver of vehicle 10. However, with the invention, as depicted in FIG. 5, the viewing angle $V_O$ has been horizontally swung further outwardly and therefore the light from any of the headlamps of such a second following vehicle in lane 48 cannot strike mirror 14 in such a manner whereby it is reflected as glare into the eyes of the driver of vehicle 10. Also even when, as depicted in FIG. 5, vehicles such as 56 and 68 are in the adjacent lane 46 and in the process of passing vehicle 10 the light, from their headlamps, as they pass through viewing angle $V_O$, is what may be considered peripheral light and not as intensely focused thereby greatly diminishing any glare effect in mirror 14 for the driver of vehicle 10. In this regard, it should also be noted that if all other conditions of operation are considered equal, the length of time that a headlamp, of a vehicle in the adjacent lane 46, will exist within the viewing angle $V_O$ of FIG. 5 is significantly shorter than the time that such headlamp would exist within the viewing angle $V_O$ of FIG. 4.

Another important benefit arises as in those situations wherein a vehicle, practicing the invention, enters an expressway as from an entrance ramp. That is, because at such time, while still on a portion defining the entrance ramp, the longitudinal axis of the vehicle is still at a significant angle with respect to the longitudinal axis of the expressway lane on which the vehicle intends to travel, the more outwardly aimed viewing angle $V_O$ of the invention (and as depicted in FIG. 5) better enables the driver to see whether other vehicles are approaching in the same expressway lane.

Also, both the inventive method and apparatus herein disclosed and described provides the driver with a familiar reference by which the driver can be assured that the outside rear view mirror is ultimately properly positioned as to eliminate the dangers of the blind zone 62 of the prior art.

Still further, the inventive apparatus herein disclosed and described, by its mere presence on a vehicle, would raise the question as to its purpose and operation. The purpose and operating instructions could, of course, be explained: (a) as in the vehicle manufacturer's operating instructions; (b) the mirror manufacturer's operating instructions; or (c) in drivers' education classes. Any of such would, of course, have the end result of reducing driving hazards and injuries.

With reference generally to FIGS. 4 and 5, even though in the preferred method and embodiments of the invention, the mirror 14 is rotated outwardly in the order of 7.5° so as to angularly move the viewing angle $V_O$ thereof in the order of 15.0° from its prior art position in FIG. 4 to the inventive position of FIG. 5, the full benefits of the invention can be obtained when such mirror 14 is rotated outwardly anywhere in the range of 4.5° to 10.5° from its prior art position of FIG. 4 to the inventive position as generally depicted and contemplated by FIG. 5 thereby correspondingly rotating the viewing angle V thereof in the range of 9.0° to 21.0°. In such situations, within such identified range, the value of said angle X would then also correspond to the range of 4.5° to 10.5°. That is, in a rear view mirror which was intended to be rotated angularly outwardly in the order of, for example, 5.5°, the related angle X of such mirror would also be in the order of 5.5°.

Further, it should be pointed out that when the inventive method is carried out with said angle X being in the order of 7.5° the outside viewing angle $V_O$ is caused to swing outwardly to where the inner limiting ray line 26a thereof does not intersect the limiting ray line 20, of the viewing angle $V_I$, anywhere over the full width of the adjacent traffic lane 46. This is depicted in FIG. 5.

In order to further define certain terms or expressions as may be employed in the appended claims: (a) the term "inside viewing angle" means viewing angle $V_I$ as of either FIGS. 1, 4 or 5 and provided as by an interior mirror 12; (b) the term "driver's side limiting ray" of the inside viewing angle means the angular limit of such inside viewing angle as depicted by ray line 20 of FIGS. 1, 4 or 5; (c) the term "passenger's side limiting ray" of the inside viewing angle means the angular limit of such inside viewing angle as depicted by ray line 22 of FIGS. 1, 4 or 5; (d) the term "outside viewing angle" means viewing angle $V_O$ as of either FIGS. 1, 4 or 5 and provided as by an outside mirror 14; (e) the term "outer limiting ray" of the outside viewing angle means the angular limit of such outside viewing angle as depicted by ray line 24 of either FIGS. 1 or 4 or ray line 24a of FIG. 5; and (f) the term "inner limiting ray" of the outside viewing angle means the angular limit of such outside viewing angle as depicted by ray line 26 of either FIGS. 1 or 4 or ray line 26a of FIG. 5.

Although only a select number of embodiments of the invention and methods of practicing the invention, all of which are at this time considered to be the best mode of practicing the invention, have been disclosed and described, it is apparent that other embodiments and modifications of the invention are possible within the scope of the appended claims.

What is claimed is:

1. A remote control mirror assembly for a motor vehicle, comprising mirror means selectably positionable by an operator of said vehicle, support means carried by said vehicle for supporting said mirror means, positioning means operatively connected to said mirror mans with respect to said support means and said vehicle, control means situated remotely from said mirror means and operatively connected to said positioning means, said control means being adapted for actuation by said operator, said control means being effective upon being actuated by said operator to cause said positioning means to rotationally position said mirror means with respect to said support means and said vehicle to a variably selectable initial position selectable by said operator, and additional control means adapted for actuation by said operator for causing said mirror means to become angularly displaced a preselected angular extent from said initial position selected by said operator as to present to said operator a view in said mirror means angularly further outward from said vehicle than the view obtained by said operator while in said initial position, wherein said preselected angular extent is of a fixed and constant non-variable magnitude determined solely by said additional control means, and wherein said mirror means remains angularly displaced said preselected angular extent from said initial position until either of said control means is again actuated.

2. A remote control mirror assembly for a motor vehicle, comprising mirror means selectably positionable by an operator of said vehicle, support means carried by said vehicle for supporting said mirror means, positioning means operatively connected to said mirror means and effective to rotationally position said mirror means with respect to said support means and said vehicle, control means situated remotely from said mirror means and operatively connected to said positioning means, said control means being adapted for actuation by said operator, said control means being effective upon being actuated by said operator to cause said positioning means to rotationally position said mirror means with respect to said support means and said vehicle to a variably selectable initial position selectable by said operator, and additional control means adapted for actuation by said operator for causing said mirror means to become angularly displaced a preselected angular extent from said initial position selected by said operator as to present to said operator a view in said mirror means angularly further outward from said vehicle than the view obtained by said operator while in said initial position, wherein said preselected angular extent is of a fixed and constant non-variable magnitude determined solely by said additional control means, and wherein said mirror means remains angularly displaced said preselected angular extent from said initial position until either of said control means is again actuated, wherein said positioning means comprises electric motor means, wherein said first mentioned control means comprises first electric switch means electrically connected to said electric motor means, wherein said additional control means comprises second electric switch means electrically connected to said electric motor means, wherein said first electric switch means is effective for energizing said electric motor means so as to have said electric motor means rotationally position said mirror means to said initial position selected by said operator, and wherein said second electric switch means is effective for energizing said electric motor means so as to have said electric motor means cause said mirror means to become angularly displaced by said preselected angular extent from said initial position selected by said operator, wherein said second electric switch means is a momentary switch, and wherein when said second electric switch means is again actuated to cause return of said mirror means from said angularly displaced position to said initial position the momentary actuation of said second switch means causes the extended energization of said electric motor means with said electric motor means remaining energized until said mirror means is thereby rotationally positioned back to said initial position.

3. An automotive outside mirror positioning means, comprising a mounting means; pivot means on said mounting means; a mirror operatively attached to said pivot means; actuation means for positioning said mirror about a vertical axis and a horizontal axis; a first switch means for controlling said actuation means to enable the driver of the vehicle on which the mirror is mounted to position the mirror to a first mirror position; a second switch means being effective when actuated by said driver to position said mirror to a second mirror position on wherein said mirror is moved by a fixed angular rotation about the vertical axis to an angular position greater than in said first mirror position relative to the longitudinal axis of said vehicle; said second switch means also being effective when actuated by said driver while said mirror is in said second mirror position to cause said mirror to return to said first mirror position, wherein said actuation means comprises electric motor means, and further comprising electronic circuit control means and electric motor activation means, said electronic circuit control means comprising first amplifier means generating electrical pulses derived from the variation in mirror current produced by motor commutation of said electric motor means, wherein the number of said pulses is directly proportional to rotation of said mirror about said vertical axis; counter means for counting the number of pulses produced by said first amplifier means; set means to set said counter means to a preset condition; counter output means indicating a fixed number of pulses to the counter; initiation means to allow said counter to count when said second switch means is actuated; H-switch means connected to said electric motor activation means; memory means having a first memory state and a second memory state; first logic means placing said memory means in said first memory state when said first switch means is actuated; second logic means placing said memory means in said second memory state after said second switch has been actuated and said mirror has been rotated to said second mirror position; third logic means for placing said memory means in said first state when said second switch is actuated and said mirror rotates from said second mirror position to said first mirror position; indicator lamp means connected to said memory means to indicate when said memory means is in said second memory state; fourth logic means connected to said H-switch means to energize said electric motor means so that said mirror rotates about said vertical axis from said first mirror position to said second mirror position when said second switch means is actuated and said memory means is in said first memory state, and so that said mirror rotates about said vertical axis from said second mirror position to said first mirror position when said second switch means is actuated and said memory means is in said second memory state; second amplifier means monitoring current flow in said H-switch means; and fifth logic means responsive to turn "off" said H-switch means when said second amplifier means detects excessive current flow.

4. A remote control mirror assembly for a motor vehicle, comprising mirror means selectably positionable by an operator of said vehicle, support means carried by said vehicle for supporting said mirror means, positioning means operatively connected to said mirror means and effective to rotationally position said mirror means with respect to said support means and said vehicle, control means situated remotely from said mirror means and operatively connected to said positioning means, said control means being adapted for actuation by said operator, said control means being effective upon being actuated by said operator to cause said positioning means to rotationally position said mirror means with respect to said support means and said vehicle to a variably selectable initial position selectable by said operator, and additional control means adapted for actuation by said operator for causing salad mirror means to become angularly displaced a preselected angular extent from said initial position selected by said operator as to present to said operator a view in said mirror means angularly further outward from said vehicle than the view obtained by said operator while in said initial position, wherein said preselected angular extent is of a fixed and constant non-variable magnitude determined solely by said additional control means, and wherein said mirror means remains angularly displaced said preselected angular extent from said initial position until either of said control means is again actuated, wherein said positioning means comprises electric motor means, wherein said first mentioned control means comprises first electric switch means electrically connected to salad electric motor means, wherein said additional control means comprises second electric switch means electrically connected to said electric motor means, wherein said first electric switch means is effective for energizing said electric motor means so as to have said electric motor means rotatinoally position said mirror means to said initial position seleced by said opeator, wherein said second electric switch meansis effective for energizing said electric motor means so as to have said electric motor means cause said mirror means to become angularly displaced by said preselected angular extent from said initial position selected by said operator, and further comprising electrical circuit means for causing and controlling energization of said electric motor means, said electrical circuit means comprising sensing means for sensing ripple-like pulses in the current flow to said electric motor mans during energization of said electric motor means caused by said second switch means, wherein the number of ripple-like pulses is directly proportional to the angular displacement of said mirror means, wherein upon said sensing means sensing the occurrence of that number of ripple-like pulses which corresponds to said preselected angular extent said electronic control unit ceases further energization of said electric motor means, and wherein when said mirror means is in said angularly displaced extent and said second switch is then again actuated said motor means becomes energized causing said motor means to return said mirror means to said initial position said initial position then being automatically achieved by having said sensing means again sense the occurrence of that number of ripple-like pulses which corresponds to said preselected angular extent and upon the attainment thereof de-energizing said electric motor means.

5. An automotive outside rearview mirror positioning means wherein said mirror is operatively connected to and rotationally positioned by electric motor means, comprising circuitry for initiation and causing a rotational output motor of said electric motor means whereby said mirror is rotationally moved from an initial mirror position to a second mirror position, wherein said initial mirror position is selectively but variably chosen by an operator wishing to employ the view of said mirror, wherein said second mirror position is of a constant magnitude of angular displacement from said initial position, wherein said constant magnitude of angular displacement is a function solely of said circuitry, wherein said electric motor means comprises at least two electrical input terminal means, wherein said circuitry comprises first circuit means effective for electrically driving said electric motor means, manually actuatable switch means actuatable by said operator for causing said first circuit means to become energized for electrically driving said electric motor means, second circuit means effective for sensing the occurrence of cyclic variations in the magnitude of the electrical current through said electric motor means and in turn producing pulses corresponding to said occurrence of said cyclic variations, logic means electrically interposed between said manually actuatable switch means and said first circuit means, said logic means comprising counter means, said counter means being effective upon said manually actuatable switch means being actuated to count the occurrences of said pulses, said counter means being effective when a preselected number of occurrences of said pulses has been counted by said counter means to cause said logic means to in turn render the electrical potential as between said at least two electrical input terminal means to become a magnitude insufficient to further electrically drive said electric motor means.

6. An automotive outside rearview mirror positioning means according to claim 5 and further comprising indicator means energized upon said electrical potential as between said at least two electrical input terminal means becoming a magnitude insufficient to further electrically drive said electric motor means.

7. An automotive outside rearview mirror positioning means according to claim 5, wherein said logic means comprises solid state electrical switch means having first and second operating states, wherein said solid state electrical switch means when in said first operating state being effective to cause said electric motor means to have a rotational output in a first direction upon actuation of said manually actuatable switch means, and wherein said solid state electrical switch means when in said second operating state being effective to cause said electric motor means to have a rotational output in a second direction opposite to said first direction upon actuation of said manually actuatable switch means.

8. An automotive outside rearview mirror positioning means according to claim 5, wherein said first circuit means comprises amplifier means said amplifier means comprising at least first and second amplifiers, wherein said first amplifier senses said occurrence of said cyclic variations and in turn produces a first amplifier output, and wherein said first amplifier output is received by said second amplifier and in turn amplified by said second amplifier.

9. An automotive outside rearview mirror positioning means according to claim 5, wherein said first circuit means comprises solid state sensing and shaping means for sensing said cyclic variations and in turn amplifying said cyclic variations and shaping such amplified cyclic variations as to thereby generate an output having a pulse train corresponding in time to said sensed cyclic variations but of significantly increased amplitude.

* * * * *

UNITED STATES PATENT AND TRADEMARK OFFICE
CERTIFICATE OF CORRECTION

PATENT NO. : 5,080,492  Page 1 of 8
DATED : January 14, 1992
INVENTOR(S) : George E. Platzer, Jr.

It is certified that error appears in the above-identified patent and that said Letters Patent is hereby corrected as shown below:

Column 4, line 44 after "degrees" insert ---- depicted in ----.

Column 4, line 45, "FIG. 1" should be continuation of immediately preceeding paragraph.

Column 4, line 64, immediately before "mirror 12" delete the quotation mark.

Column 5, line 33, delete the three erroneous symbols between "the" and "midpoint".

Column 5, line 35, change "AB" to ---- $\overline{AB}$ ----.

In Column 5, change the first-appearing equation to read:

$$V_T = 2\tan^{-1} \frac{\overline{AB} + \overline{CD}}{2 \quad \overline{EO}}$$

UNITED STATES PATENT AND TRADEMARK OFFICE
CERTIFICATE OF CORRECTION

PATENT NO. : 5,080,492

DATED : January 14, 1992

INVENTOR(S) : George E. Platzer, Jr.

It is certified that error appears in the above-identified patent and that said Letters Patent is hereby corrected as shown below:

In Column 5, change the second-appearing equation to read:

$$V_B = 2\tan^{-1} \frac{\overline{AB} - \overline{CD}}{2\,\overline{EO}}$$

Column 6, line 38, immediately after "as" insert ---- commonly unexpected relationships, to wit: ----.

Column 6, line 48, delete "total" and substitute therefor ---- tall ----.

Column 7, line 4, delete "so" and substitute therefor ---- two ----.

Column 7, line 13, change "the of" to read ---- thereof ----.

UNITED STATES PATENT AND TRADEMARK OFFICE
CERTIFICATE OF CORRECTION

PATENT NO. : 5,080,492

DATED : January 14, 1992

INVENTOR(S) : George E. Platzer, Jr.

It is certified that error appears in the above-identified patent and that said Letters Patent is hereby corrected as shown below:

Column 7, line 17, before "customary" change "an" to ---- in ----.

Column 7, line 24, immediately after "driver in vehicle 10" insert ---- when such driver's face and eyes are directed straight forwardly. Since under such conditions (the driver of vehicle 10 ----.

Column 7, line 62, immediately before "mirror 14" insert ---- This lack of information exists even though an inspection of Figure 4 will reveal that the outside mirror 14, as employed in customary prior art practice, adds about a half a vehicle length of viewing distance in the left lane 46 as compared to the view obtainable from the inside mirror 12. Obviously, such amount of additional viewing area provided by the outside ----.

UNITED STATES PATENT AND TRADEMARK OFFICE
CERTIFICATE OF CORRECTION

PATENT NO. : 5,080,492
DATED : January 14, 1992
INVENTOR(S) : George E. Platzer, Jr.

It is certified that error appears in the above-identified patent and that said Letters Patent is hereby corrected as shown below:

Column 16, line 42, after "input" insert ---- 500 ----.

Column 16, line 43, after "terminal" insert ---- 504 ----.

Column 16, line 44, immediately after "Figure" change "-B" to read ---- 11-B ----.

Column 16, line 52, before "and 340" insert ---- 338 ----.

Column 16, line 60, after "capacitor means" insert ---- 530 ----.

Column 18, line 44, change "544" to ---- 554 ----.

Column 18, line 56, change "3009" to ---- 300) ----.

UNITED STATES PATENT AND TRADEMARK OFFICE
CERTIFICATE OF CORRECTION

PATENT NO. : 5,080,492

DATED : January 14, 1992

INVENTOR(S) : George E. Platzer, Jr.

It is certified that error appears in the above-identified patent and that said Letters Patent is hereby corrected as shown below:

Column 18, line 62, change "firs" to ---- first ----.

Column 19, line 4, change "increases the" to read ---- increases and ----.

Column 19, line 5, change "pint" to ---- point ----.

Column 19, line 40, change "4080" to ---- 408 ----.

Column 19, line 56, change "logical" to ---- logic ----.

Column 26, line 3, between "and" and "may" insert ---- 328 ----.

UNITED STATES PATENT AND TRADEMARK OFFICE
CERTIFICATE OF CORRECTION

PATENT NO. : 5,080,492

DATED : January 14, 1992

INVENTOR(S) : George E. Platzer, Jr.

It is certified that error appears in the above-identified patent and that said Letters Patent is hereby corrected as shown below:

Column 26, line 9, between "and" and "may" insert ---- 668 ----.

Column 30, line 35, between "surface" and "and" insert ---- 91 ----.

Column 30, line 45, change "$d_2$" to ---- $d_2'$ ----.

Column 32, line 62, change "V" to ---- $V_0$ ----.

Column 33, line 43 (Claim 1, line 7 thereof), change "mans" to ---- means ----.

Column 34, line 60 (Claim 3, line 11 thereof), cancel "on".

Column 35, line 4 (Claim 3, line 23 thereof), change "mirror" to ---- motor ----.

UNITED STATES PATENT AND TRADEMARK OFFICE
CERTIFICATE OF CORRECTION

PATENT NO. : 5,080,492

DATED : January 14, 1992

INVENTOR(S) : George E. Platzer, Jr.

It is certified that error appears in the above-identified patent and that said Letters Patent is hereby corrected as shown below:

Column 35, line 57 (Claim 4, line 17 thereof), change "salad" to ---- said ----.

Column 36, line 4 (Claim 4, line 32 thereof), change "salad" to ---- said ----.

Column 36, line 9 (Claim 4, line 37 thereof), change "rotatinoally" to ---- rotationally ----.

Column 36, line 10 (Claim 4, line 38 thereof), change "seleced" to ---- selected ----.

Column 36, line 11 (Claim 4, line 39 thereof), change "opeator" to ---- operator ----.

Column 36, line 11 (Claim 4, line 39 thereof), change "meansis" to ---- means is ----.

UNITED STATES PATENT AND TRADEMARK OFFICE
CERTIFICATE OF CORRECTION

PATENT NO. : 5,080,492
DATED : January 14, 1992
INVENTOR(S) : George E. Platzer, Jr.

It is certified that error appears in the above-identified patent and that said Letters Patent is hereby corrected as shown below:

Column 36, line 20 (Claim 4, line 48 thereof), change "mans" to ---- means ----.

Column 36, line 43 (Claim 5, line 5 thereof), after "output" change "motor" to ---- motion ----.

Column 38, line 7 (Claim 8, line 3 thereof), between "means" and "said" and immediately after "means" insert a comma (,).

Signed and Sealed this

Nineteenth Day of October, 1993

Attest:

BRUCE LEHMAN

*Attesting Officer*   *Commissioner of Patents and Trademarks*